(12) United States Patent
Greenwald et al.

(10) Patent No.: US 11,289,861 B2
(45) Date of Patent: Mar. 29, 2022

(54) POWER PANELS INCLUDING CONDUCTIVE CLIP ASSEMBLIES AND BUS STACK ARRANGEMENTS INCORPORATING SAFETY FEATURES

(71) Applicant: ABB Schweiz Ag, Baden (CH)

(72) Inventors: Steven Andrew Greenwald, Plainville, CT (US); Jamie Wakefield, Windsor, CT (US); Justin Daniel Dubrosky, Bristol, CT (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/019,813

(22) Filed: Sep. 14, 2020

(65) Prior Publication Data

US 2021/0083442 A1    Mar. 18, 2021

Related U.S. Application Data

(60) Provisional application No. 62/900,087, filed on Sep. 13, 2019.

(51) Int. Cl.
| | |
|---|---|
| *H02B 1/052* | (2006.01) |
| *H02B 1/21* | (2006.01) |
| *H01R 25/14* | (2006.01) |
| *H01R 43/26* | (2006.01) |
| *H01R 13/15* | (2006.01) |
| *H02B 1/044* | (2006.01) |

(52) U.S. Cl.
CPC .......... *H01R 25/142* (2013.01); *H01R 13/15* (2013.01); *H01R 43/26* (2013.01); *H02B 1/044* (2013.01); *H02B 1/052* (2013.01); *H02B 1/21* (2013.01)

(58) Field of Classification Search
CPC .... H01R 25/142; H01R 25/14; H01R 25/162; H01R 43/26; H01R 13/15; H02B 1/205; H02B 1/21; H02B 1/052; H01H 1/24; H01H 1/44; H01H 2001/425
See application file for complete search history.

(56) References Cited

U.S. PATENT DOCUMENTS

| | | | | |
|---|---|---|---|---|
| 3,197,599 A | * | 7/1965 | Lingenfelter | ............ H01H 1/44 200/258 |
| 9,979,164 B2 | * | 5/2018 | Baillargeon | ............. H02B 1/20 |
| 10,164,387 B2 | * | 12/2018 | Baillargeon | ........... H02B 1/052 |

FOREIGN PATENT DOCUMENTS

| | | |
|---|---|---|
| CN | 107732474 A | 2/2018 |
| CN | 208508000 U | 2/2019 |
| CN | 110635428 B | 1/2021 |

(Continued)

OTHER PUBLICATIONS

U.K. Patent Office, Corrected Search Report issued in corresponding Application No. GB2014315.2, dated Mar. 5, 2021, 6 pp.

*Primary Examiner* — Vanessa Girardi
(74) *Attorney, Agent, or Firm* — Greenberg Traurig, LLP

(57) ABSTRACT

A power panel of an electrical distribution system including a bus arrangement with a plurality of conductive bus bars. At least one electrical accessory is coupled to the plurality of bus bars and a plurality of clip assemblies are coupled to the plurality of bus bars and the at least one electrical assembly to establish an electrical connection there between. The clip assembly for use with the bus stack arrangement includes a metallic clip with a tang and a C-shaped section interconnected with and arranged opposite the tang and a biasing element coupled to the tang.

32 Claims, 9 Drawing Sheets

(56) References Cited

FOREIGN PATENT DOCUMENTS

EP 3104466 A1 12/2016
EP 3767759 A1 1/2021

* cited by examiner

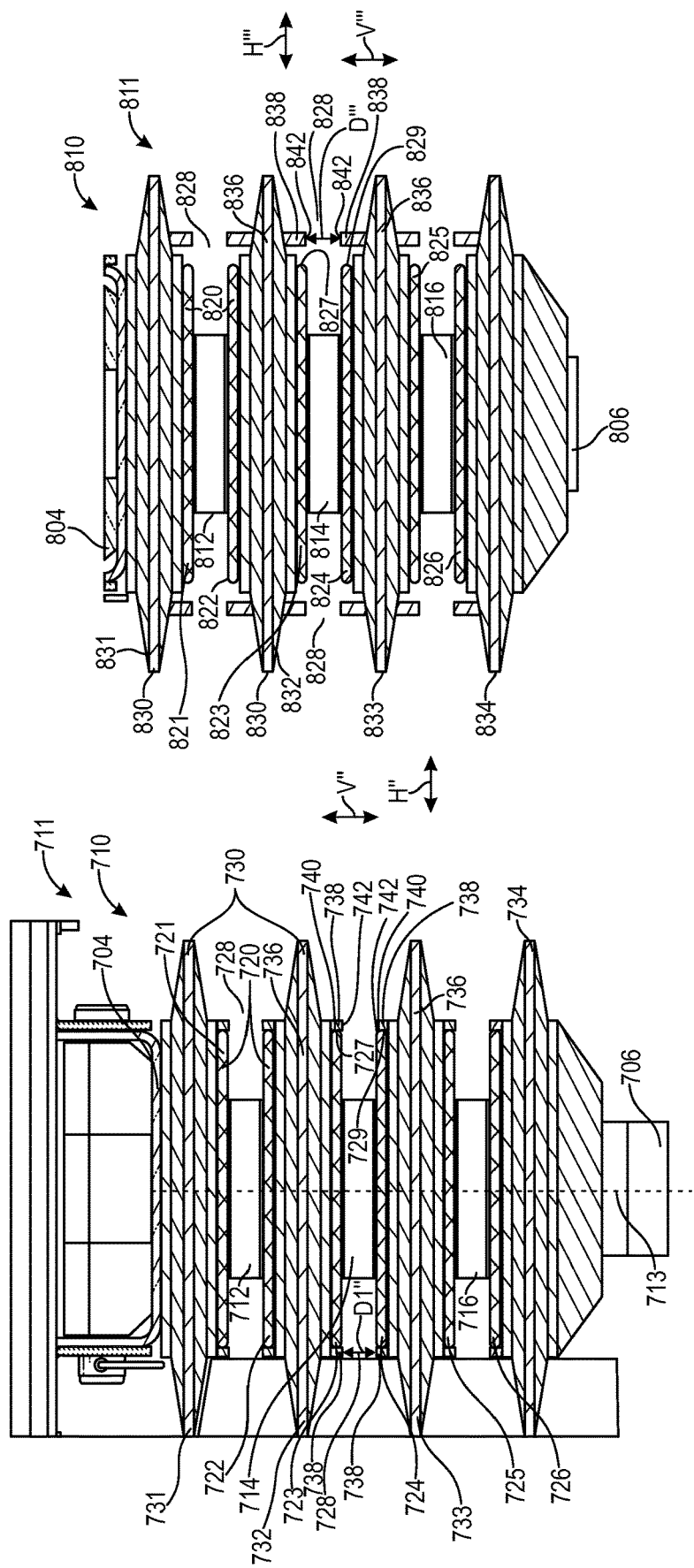

POWER PANELS INCLUDING CONDUCTIVE CLIP ASSEMBLIES AND BUS STACK ARRANGEMENTS INCORPORATING SAFETY FEATURES

FIELD OF THE DISCLOSURE

The present disclosure relates, generally, to power panels of electrical power distribution systems, and, more particularly, to conductive clip assemblies and bus stack arrangements included in such power panels.

BACKGROUND OF THE DISCLOSURE

During operation of electrical power distribution systems, operator exposure to certain components may pose safety concerns. For example, operators that install, maintain, and/or service power panels of electrical power distribution systems may be exposed to live components that provide electrical power to one or more electrical loads or accessories. Devices, systems, and/or methods adapted for electrical power distribution systems that increase safety for operators such as maintenance personnel, for example, therefore remain an area of interest.

Electrical power distribution systems may incorporate conductive devices to conduct electrical power supplied to one or more line-side devices to one or more load-side devices. The electrical connection between the one or more line-side devices and the one or more load-side devices may be dependent upon contact between the conductive devices and the one or more line-side devices, among other things. Devices, systems, and/or methods adapted for electrical power distribution systems that improve establishment of contact between conductive devices and one or more load-side devices therefore remain an area of interest.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 7 is an elevation view of a third bus stack arrangement incorporating safety features that is adapted for use in the power panel depicted in FIG. 1;

FIG. 8 is an elevation view of a fourth bus stack arrangement incorporating safety features that is adapted for use in the power panel depicted in FIG. 1;

DETAILED DESCRIPTION OF ILLUSTRATIVE EMBODIMENTS

Figure 1:
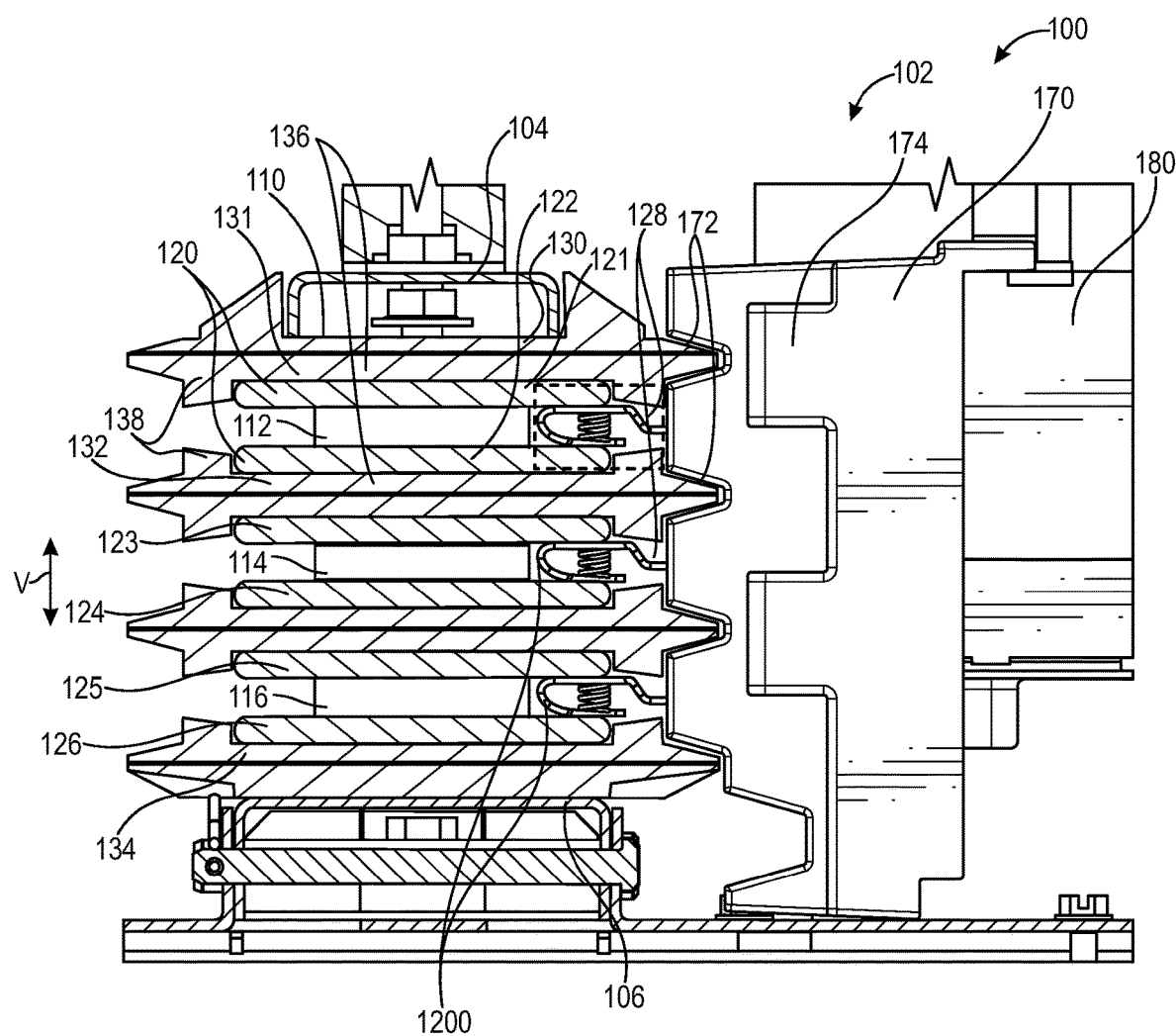
FIG. 1 is an elevation view of a power panel of an electrical power distribution system that incorporates a first bus stack arrangement having a number of safety features and one or more electrical accessories.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

Referring now to FIG. 1, an illustrative electrical power distribution system 100 includes a power panel, panel board, or switch board 102. In the illustrative embodiment, the power panel 102 includes a bus stack arrangement 110, a connector kit 170, and at least one electrical accessory or load 180. The bus stack arrangement 110 is coupled to a source of electrical power (e.g., a utility line) to receive electrical power therefrom and to the electrical load 180 to provide electrical power thereto. The connector kit 170 provides a connection interface between the bus stack arrangement 110 and the electrical load 180 to enable multiple phases of electrical power to be provided from the bus stack arrangement 110 to the electrical load 180, at least in some embodiments. The connector kit 170 and the electrical load 180 are examples of load-side components according to the illustrated embodiment and are conductively coupled with load-side portions of conductive clip assemblies 1200. In other embodiments the connector kit 170 may be omitted or may be provided as an integral element of the accessory or load 180 and the load 180 may be may be directly conductively coupled with load-side portions of conductive clip assemblies 1200.

In the illustrative embodiment, the connector kit 170 is formed to include notches 172 that are sized to receive components (i.e., insulators 130) of the bus stack arrangement 110 to at least partially align, retain and/or secure those components in a desired position and/or orientation. Additionally, in the illustrative embodiment, the connector kit 170 is configured to at least partially receive or house (i.e., in a polymeric housing 174) load-side portions of conductive clip assemblies 1200 (see FIG. 13) included in the power panel 102 as well as connective devices (e.g., conductive straps, contacts, brackets, fasteners, wires, or the like) configured for interaction with the clip assemblies 1200 to electrically couple the bus stack arrangement 110 to the electrical load 180. A load-side conductor of clip assemblies 1200 may conductively couple the clip assemblies 1200 with a conductor of the connector kit 170 via the contacting of respective conductive surfaces of the a load side portion of the clip assemblies 1200 and the conductor of the connector kit 170 or, in embodiments where the connector kit 170 is omitted or provided as an integral element of the accessory or load 180, via the contacting of respective conductive surfaces of the a load side portion of the clip assemblies 1200 and a conductor of load 180. In any case, the illustrative connector kit 170 is configured to provide electrical insulation between the connective devices to facilitate establishment of electrical connections between the bus stack arrangement 110 and the electrical load 180. To that end, at least in some embodiments, the housing 174 may be at least partially filled with an electrical insulator, such as glass, for example.

In the illustrative embodiment, the at least one electrical load 180 is embodied as, or otherwise includes, any device or collection of devices configured for electrical coupling to the bus stack arrangement 110 in use of the power panel 102. For the purposes of the present disclosure, the bus stack arrangement 110 may be referred to as a line-side device, whereas the electrical load 180 may be referred to as a load-side device. Additionally, features of the clip assemblies 1200 or other components that contact, are directly coupled to, or otherwise directly interface with components of the bus stack arrangement 110 may be given line-side designations herein, whereas features of the clip assemblies 1200 or other components that contact, are directly coupled to, or otherwise directly interface with components associated with the electrical load 180 may be given load-side designations. Regardless, the electrical load 180 is illustratively embodied as, or otherwise includes, a circuit breaker. Of course, it should be appreciated that in other embodiments, the electrical load 180 may be embodied as, or otherwise include, another type of load device.

The illustrative bus stack arrangement 110 includes conductive bus bars 120 that are spaced from one in a vertical direction V and coupled to the at least one electrical load 180 (i.e., via the clip assemblies 1200) to distribute electrical power to the load 180. In the illustrative embodiment, the bus bars 120 include bus bars 121, 122, 123, 124, 125, 126 that extend parallel to one another and are arranged in a first bus bar pair (i.e., 121, 122), a second bus bar pair (i.e., 123, 124), and a third bus bar pair (i.e., 125, 126). The three bus bar pairs are associated with three different phases of electrical power that are provided to the bus stack arrangement 110 in use of the power panel 102. As such, the bus stack arrangement 110 may be said to include two bus bars 120 per power phase.

Each of the illustrative bus bars 120 has a metallic construction. In the illustrative embodiment, each of the bus bars 120 is formed from copper. In other embodiments, however, each of the bus bars 120 may be formed from another suitable metallic material. In any case, a metallic spacer or donut 112 is disposed between the bus bars 121, 122, a metallic spacer or donut 114 is disposed between the bus bars 123, 124, and a metallic spacer or donut 116 is disposed between the bus bars 125, 126. The spacers 112, 114, 116 have a metallic construction substantially identical to, or otherwise substantially similar to, the bus bars 120.

The illustrative bus stack arrangement 110 includes insulators 130 to provide electrical insulation between multiple conductive bus bars 120 and/or between one of the bus bars 120 and another component (e.g., one of the metallic brackets 104, 106). In the illustrative embodiment, the insulators 130 includes insulators 131, 132, 133, 134 that are arranged in insulator pairs corresponding to the bus bar pairs. More specifically, the insulators 130 are arranged in a first insulator pair (i.e., 131, 132) corresponding to the first bus pair (i.e., 121, 122), a second insulator pair (i.e., 132, 133) corresponding to the second bus pair (i.e., 123, 124), and a third insulator pair (i.e., 133, 134) corresponding to the third bus pair (i.e., 125, 126). The insulator 132 is arranged between the first and second bus bar pairs and the insulator 133 is arranged between the second and third bus bar pairs. The insulator 131 is arranged between the bracket 104 and the first bus bar pair and the insulator 134 is arranged between the third bus bar pair and the bracket 106.

In the illustrative embodiment, each of the insulators 130 has a polymeric construction. At least in some embodiments, each of the insulators 130 may be at least partially filled with an electrical insulator, such as glass, for example. Of course, it should be appreciated that in other embodiments, each of the insulators 130 may have another suitable construction and may be at least partially filled with another suitable material.

The illustrative insulators 130 cooperate to define gaps 128 in the vertical direction V through which the clip assemblies 1200 extend in use of the power panel 102 and through which a foreign object (e.g., an electrical probe) may be inserted such that the foreign object is in proximity to one or more of the bus bars 120, as further discussed below. The gaps 128 are defined in substantially identical fashion between projections 138 of adjacent insulators 130. For the sake of simplicity, the gaps 128 defined between the insulators 131, 132 are described in greater detail below with reference to FIGS. 2 and 3.

Figure 5:
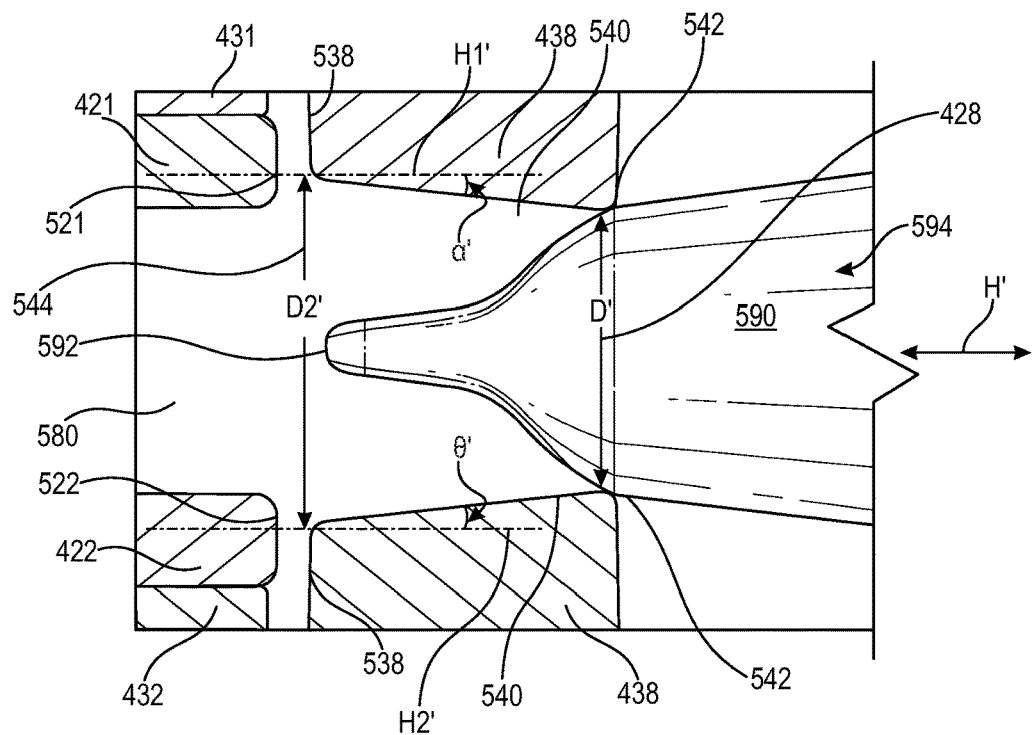
FIG. 5 is a magnified view of the bus stack arrangement depicted in FIG. 4 with an electrical probe oriented in one orientation in a gap defined between a pair of safety features.
Figure 6:
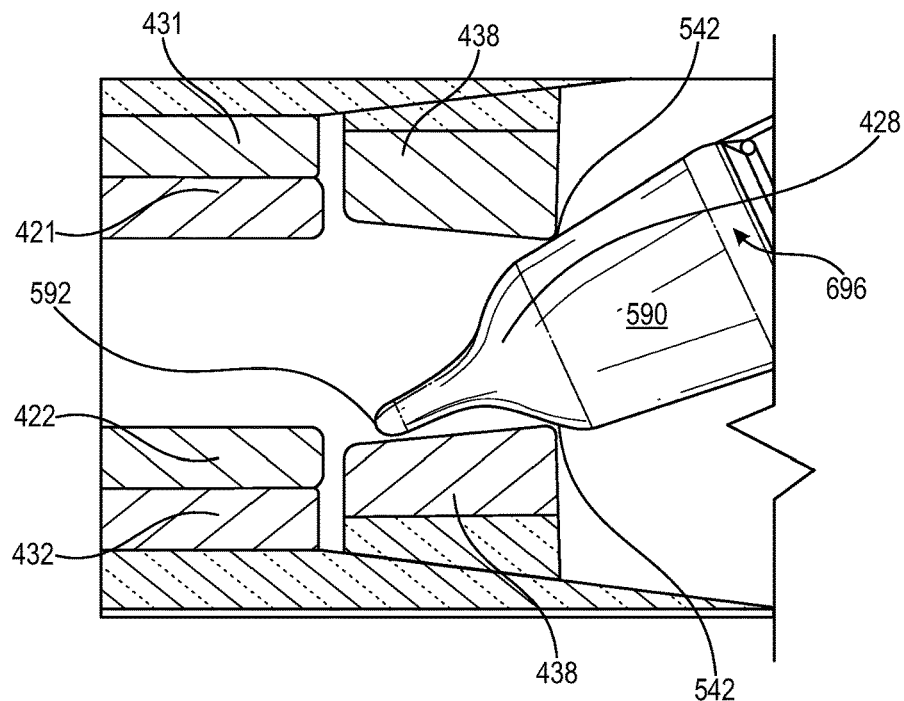
FIG. 6 is a magnified view of the bus stack arrangement depicted in FIG. 4 with the electrical probe oriented in another orientation in the gap.
Figure 13:
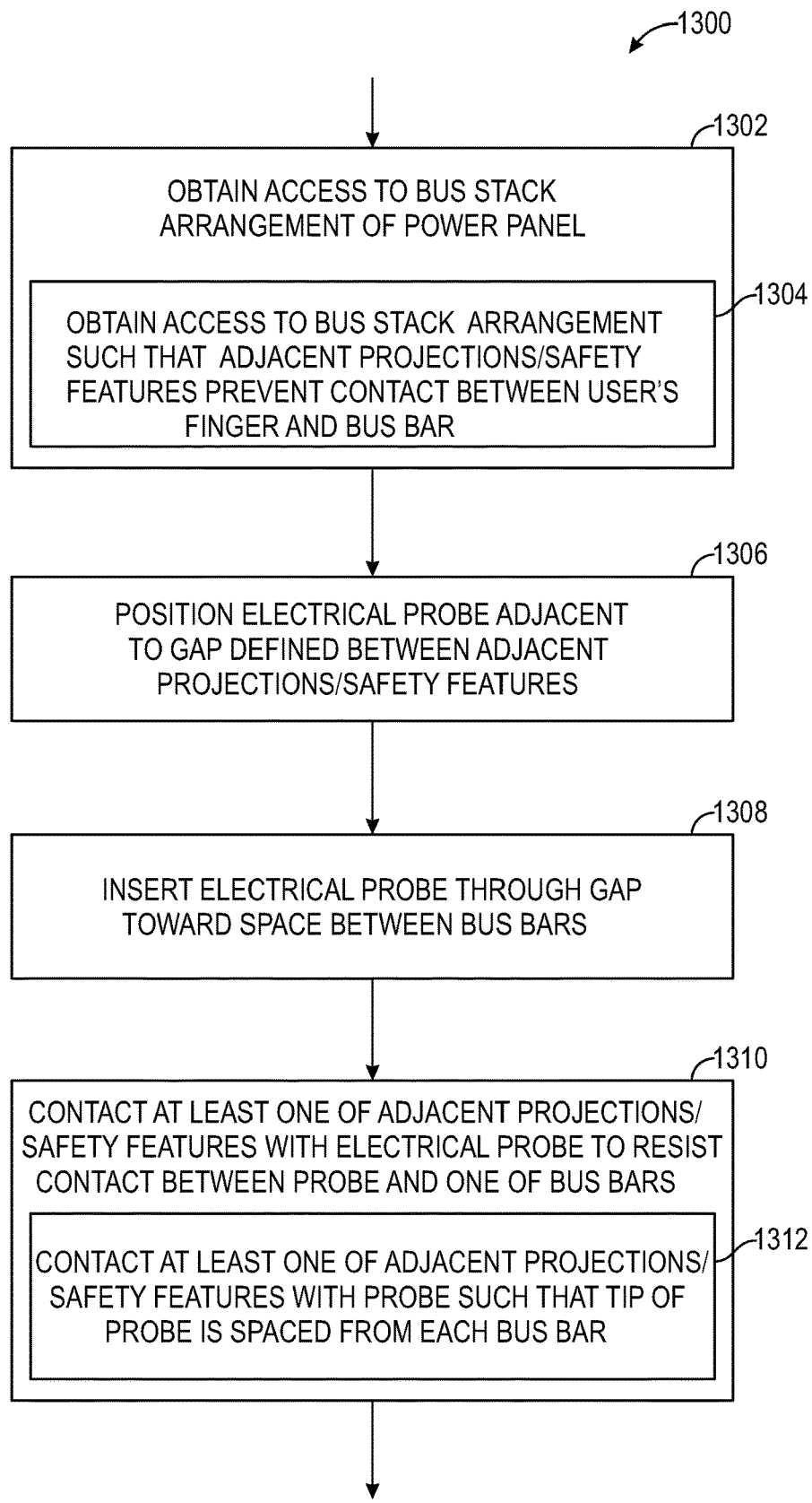
FIG. 13 is a simplified flowchart of a method of servicing the power panel depicted in FIG. 1.

Each of the insulators 130 includes a main body 136 and at least one projection or safety feature 138 that extends outwardly from the main body 136 along one of the bus bars 120. Whereas the insulators 132, 133 each include four projections or safety features 138, the insulators 131, 134 each include two projections or safety features 138. The projections 138 of adjacent insulators 130 extend toward one another in the vertical direction V to define the gaps 128 therebetween that are sized to resist insertion of foreign objects through the gaps 128 such that the inserted foreign objects contact one of the bus bars 120 arranged adjacent the gaps 128, as best seen in FIGS. 5 and 6. Additionally, the gaps 128 are sized to permit insertion therethrough of conductive components (e.g., the clip assemblies 1200) to establish an electrical connection between the bus bars 120 and the electrical load 180 through the conductive components in use of the power panel 102, as best seen in FIGS. 1 and 13.

Figure 2:
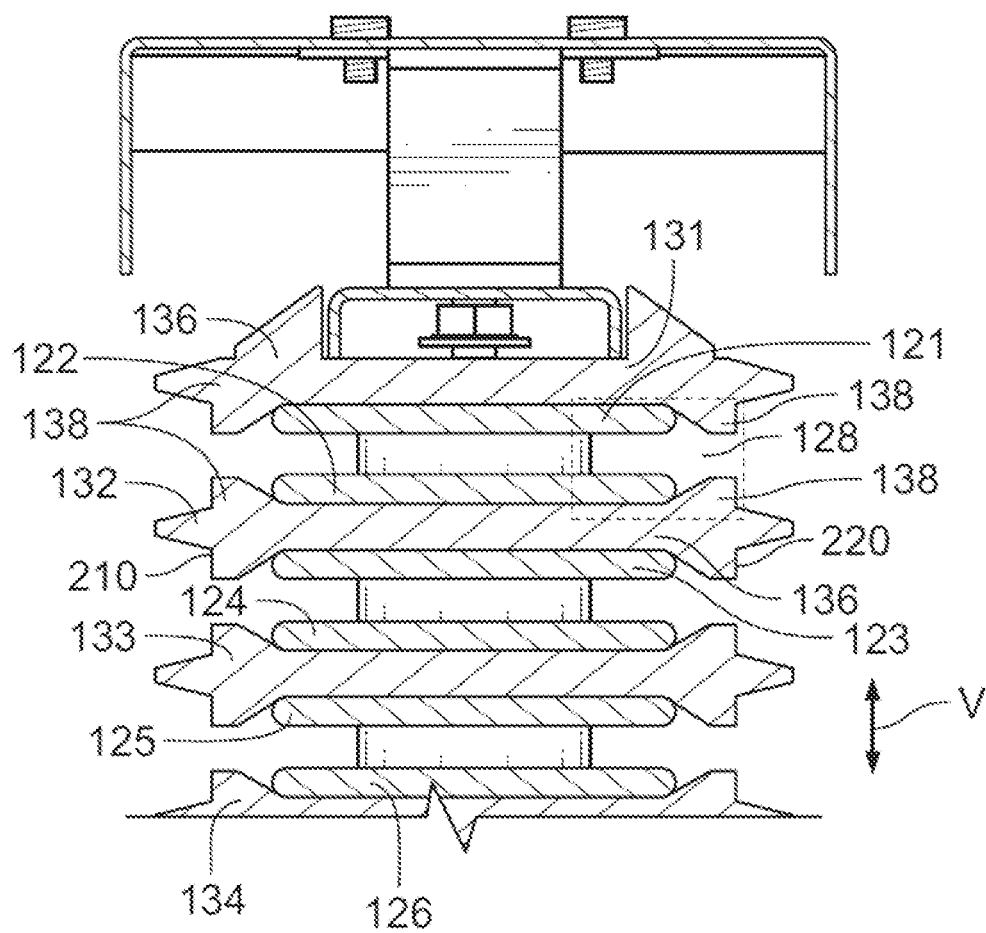
FIG. 2 is an elevation view of the bus stack arrangement depicted in FIG. 1 with certain features of the power panel (e.g., the one or more electrical accessories) omitted for the sake of simplicity.
Figure 3:
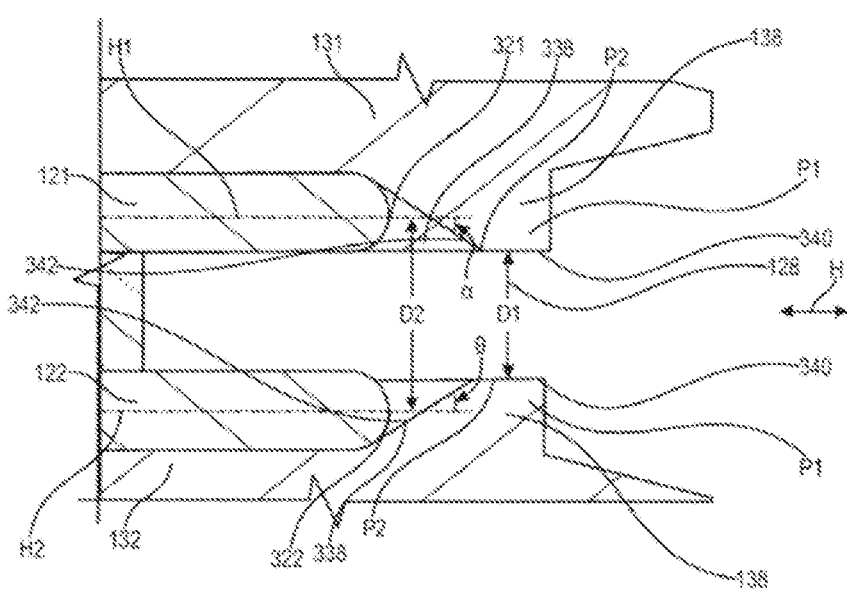
FIG. 3 is a detail view of multiple safety features of the bus stack arrangement depicted in FIG. 2.

Referring now to FIGS. 2 and 3, using the adjacent insulators 131, 132 as an example, the projections 138 of the insulators 131, 132 cooperate to define gaps 128 adjacent a first side 210 of the bus stack arrangement 110 and adjacent a second side 220 of the bus stack arrangement 110. The sides 210, 220 of the bus stack arrangement 110 are arranged substantially opposite one another. Gaps 128 are defined adjacent the sides 210, 220 by the projections 138 of the other insulator pairs (e.g., the insulator pair 132, 133 and the insulator pair 133, 134) in substantially similar fashion.

In the illustrative embodiment, innermost edges 338 of the projections 138 are spaced from outermost edges 321, 322 of the corresponding bus bars 121, 122 in a horizontal direction H. A portion P1 of the uppermost projection 138 (i.e., as depicted in FIG. 3) extends substantially parallel to a horizontal axis H1 defined by the adjacent bus bar 121. Similarly, a portion P1 of the lowermost projection 138 (i.e., as depicted in FIG. 3) extends substantially parallel to a horizontal axis H2 defined by the adjacent bus bar 122. A portion P2 of the uppermost projection 138 that is interconnected with the portion P1 thereof extends at an angle α to the axis H1. A portion P2 of the lowermost projection 138 that is interconnected with the portion P1 thereof extends at an angle θ to the axis H2.

Each of the illustrative angles α, θ is embodied as, or otherwise includes, an acute angle. In at least some embodiments, the magnitudes of the angles α, θ may be substantially identical to one another. Of course, it should be appreciated that in other embodiments, each of the angles α, θ may be embodied as, or otherwise include, another suitable angle. Furthermore, in other embodiments, it should be appreciated that the magnitudes of the angles α, θ may be different from one another.

In the illustrative embodiment, the portions P1 of the uppermost and lowermost projections 138 define generally planar faces 340 that face one another and are arranged in confronting relation to one another. Additionally, in the illustrative embodiment, the portions P2 of the uppermost and lowermost projections 138 define generally planar faces 342 that face one another and are arranged in confronting relation to one another. In other embodiments, however, the portions P1 of the uppermost and lowermost projections 138 may have another suitable arrangement relative to one another and define faces having other suitable geometries, and the portions P2 of the uppermost and lowermost projections 138 may have another suitable arrangement relative to one another and define faces having other suitable geometries.

In the illustrative embodiment, the gaps 128 defined between the projections 138 of the insulators 131, 132 are sized to resist insertion therethrough of a human finger or an electrical probe having a diameter of at least 12 millimeters such that the inserted object contacts one of the bus bars 121, 122 arranged adjacent the gaps 128. Accordingly, in at least some embodiments, the projections 138 are embodied as, or otherwise include, safety features that provide, satisfy, or are otherwise associated with, a predetermined safety standard, for example, the IP20 safety standard or another safety standard. As such, at least in some embodiments, the faces 340 of the insulators 131, 132 which define the gaps 128 are spaced a distance D1 from one another that is no greater than 12 millimeters. Of course, in other embodiments, the distance D1 may have another suitable value.

In the illustrative embodiment, the portions P2 of the insulators 131, 132 are spaced from one another by various distances D2 along the faces 342 of the uppermost and lowermost projections. At least in some embodiments, one or more of the various distances D2 are greater than the distance D1. In such embodiments, one or more of the various distances D2 may be greater than 12 millimeters. Of course, in other embodiments, the various distances D2 may have other suitable values.

Figure 4:
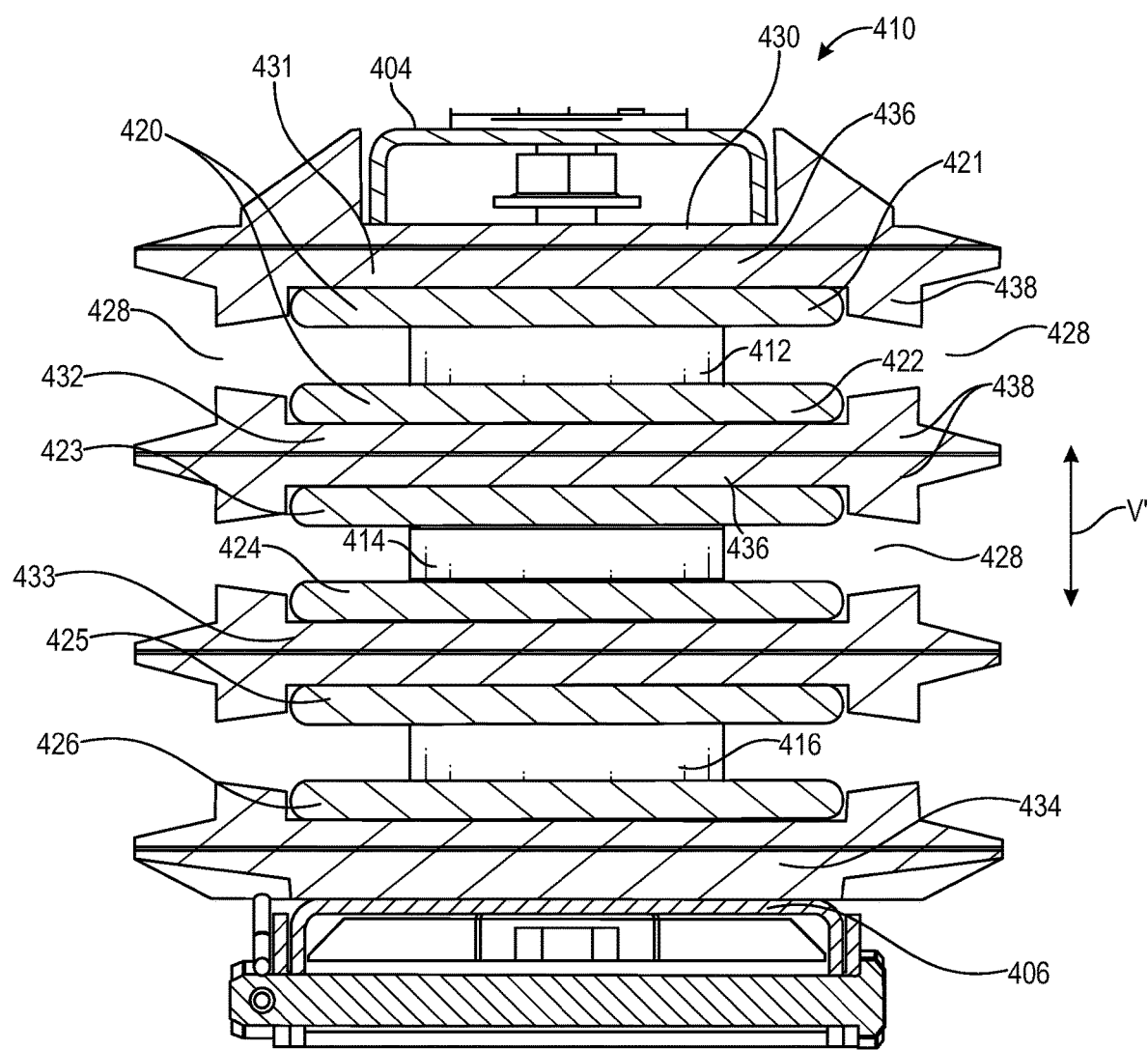
FIG. 4 is an elevation view of a second bus stack arrangement incorporating safety features that is adapted for use in the power panel depicted in FIG. 1.

Referring now to FIG. 4, an illustrative bus stack arrangement 410 adapted for use in the power panel 102 includes conductive bus bars 420 substantially similar to the bus bars 120 that are spaced from one in a vertical direction V'. In the illustrative embodiment, the bus bars 420 include bus bars 421, 422, 423, 424, 425, 426 that extend parallel to one another and are arranged in a first bus bar pair (i.e., 421, 422), a second bus bar pair (i.e., 423, 424), and a third bus bar pair (i.e., 425, 426). The three bus bar pairs are associated with three different phases of electrical power that are provided to the bus stack arrangement 410. As such, the bus stack arrangement 410 may be said to include two bus bars 420 per power phase.

Each of the illustrative bus bars 420 has a metallic construction. In the illustrative embodiment, each of the bus bars 420 is formed from copper. In other embodiments, however, each of the bus bars 420 may be formed from another suitable metallic material. In any case, a metallic spacer or donut 412 is disposed between the bus bars 421, 422, a metallic spacer or donut 414 is disposed between the bus bars 423, 424, and a metallic spacer or donut 416 is disposed between the bus bars 425, 426. The spacers 412, 414, 416 have a metallic construction substantially identical to, or otherwise substantially similar to, the bus bars 420.

The illustrative bus stack arrangement 410 includes insulators 430 to provide electrical insulation between multiple conductive bus bars 420 and/or between one of the bus bars 420 and another component (e.g., one of the metallic brackets 404, 406). In the illustrative embodiment, the insulators 430 includes insulators 431, 432, 433, 434 that are arranged in insulator pairs corresponding to the bus bar pairs. More specifically, the insulators 430 are arranged in a first insulator pair (i.e., 431, 432) corresponding to the first bus bar pair (i.e., 421, 422), a second insulator pair (i.e., 432, 433) corresponding to the second bus bar pair (i.e., 423, 424), and a third insulator pair (i.e., 433, 434) corresponding to the third bus bar pair (i.e., 425, 426). The insulator 432 is arranged between the first and second bus bar pairs and the insulator 433 is arranged between the second and third bus bar pairs. The insulator 431 is arranged between the bracket 404 and the first bus bar pair and the insulator 434 is arranged between the third bus bar pair and the bracket 406.

In the illustrative embodiment, each of the insulators 430 has a polymeric construction. At least in some embodiments, each of the insulators 430 may be at least partially filled with an electrical insulator, such as glass, for example. Of course, it should be appreciated that in other embodiments, each of the insulators 430 may have another suitable construction and may be at least partially filled with another suitable material.

The illustrative insulators 430 cooperate to define gaps 428 in the vertical direction V' through which conductive components (e.g., the clip assemblies 1200) may extend and through which a foreign object (e.g., an electrical probe) may be inserted such that the foreign object is in proximity to one or more of the bus bars 420, as further discussed below. The gaps 428 are defined in substantially identical fashion between projections 438 of adjacent insulators 430. For the sake of simplicity, the gaps 428 defined between the insulators 431, 432 are described in greater detail below with reference to FIGS. 5 and 6.

Each of the insulators 430 includes a main body 436 and at least one projection or safety feature 438 that extends outwardly from the main body 436 along one of the bus bars 420. Whereas the insulators 432, 433 each include four projections or safety features 438, the insulators 431, 434 each include two projections or safety features 438. The projections 438 of adjacent insulators 430 extend toward one another in the vertical direction V' to define the gaps 428 therebetween that are sized to resist insertion of foreign objects through the gaps 428 such that the inserted foreign objects contact one of the bus bars 420 arranged adjacent the gaps 428, as best seen in FIGS. 5 and 6. Additionally, the gaps 428 are sized to permit insertion therethrough of conductive components (e.g., the clip assemblies 1200) to establish an electrical connection between the bus bars 420 and an electrical load (e.g., the electrical load 180) through the conductive components.

Referring now to FIGS. 5 and 6, in the illustrative embodiment, and using the adjacent insulators 431, 432 as an example, innermost edges 538 of the projections 438 are spaced from outermost edges 521, 522 of the corresponding bus bars 421, 422 in a horizontal direction H'. The uppermost projection 438 (i.e., as depicted in FIG. 5) extends at an angle α' relative to a horizontal axis H1' defined by the adjacent bus bar 421. Similarly, the lowermost projection 438 (i.e., as depicted in FIG. 5) extends at an angle θ0' relative to a horizontal axis H2' defined by the adjacent bus bar 422.

Each of the illustrative angles α', θ' is embodied as, or otherwise includes, an acute angle. In at least some embodiments, the magnitudes of the angles α', θ' may be substantially identical to one another. Of course, it should be appreciated that in other embodiments, each of the angles α', θ' may be embodied as, or otherwise include, another suitable angle. Furthermore, in other embodiments, it should be appreciated that the magnitudes of the angles α', θ' may be different from one another.

In the illustrative embodiment, each of the projections 438 of the insulators 431, 432 has a trapezoidal cross-sectional shape. The uppermost and lowermost projections 438 define generally planar faces 540 that face one another and are arranged in confronting relation to one another. In other embodiments, however, the projections 438 may have another suitable cross-sectional shape and define faces having other suitable geometries.

In the illustrative embodiment, the gaps 428 are defined between outermost edges 542 of the projections 438 of the adjacent insulators 431, 432. The gaps 428 defined between the projections 438 of the insulators 431, 432 are sized to resist insertion therethrough of a human finger or an electrical probe having a diameter of at least 12 millimeters such that the inserted object contacts one of the bus bars 421, 422 arranged adjacent the gaps 428. Accordingly, in at least some embodiments, the projections 438 are embodied as, or otherwise include, safety features that provide, satisfy, or are otherwise associated with, a predetermined safety standard, for example, the IP20 safety standard or another safety standard. As such, at least in some embodiments, the outermost edges 542 of the adjacent insulators 431, 432 which define the gaps 428 are spaced a distance D1' from one another that is no greater than 12 millimeters. Of course, in other embodiments, the distance D1' may have another suitable value.

In the illustrative embodiment, the innermost edges 538 of the projections 438 of the adjacent insulators 431, 432 are spaced a distance D2' from one another to define openings 544 that are fluidly coupled to the gaps 428. At least in some embodiments, the distance D2' is greater than the distance D1'. In such embodiments, the distance D2' may be greater than 12 millimeters. Of course, in other embodiments, the distance D2' may have another suitable value.

As shown in each of FIGS. 5 and 6, an electrical probe 590 is inserted through the gap 428 toward a space 580 defined between the bus bars 421, 422. The size of the gap 428 prevents, or otherwise substantially resists, contact between one of the bus bars 421, 422 and a tip 592 of the electrical probe 590 when the electrical probe 590 is in a first orientation 594 (shown in FIG. 5) and when the electrical probe 590 is in a second orientation 696 (shown in FIG. 6). More specifically, due to the size of the gap 428, the electrical probe 590 contacts at least one of the uppermost and lowermost projections 438 of the insulators 431, 432 to resist contact between the probe 590 and one of the bus bars 421, 422 through the gap 428.

Referring now to FIG. 7, an illustrative bus stack arrangement 710 adapted for use in the power panel 102 includes conductive bus bars 720 substantially similar to the bus bars 120 that are spaced from one in a vertical direction V'''. In the illustrative embodiment, the bus bars 720 include bus bars 721, 722, 723, 724, 725, 726 that extend parallel to one another and are arranged in a first bus bar pair (i.e., 721, 722), a second bus bar pair (i.e., 723, 724), and a third bus bar pair (i.e., 725, 726). The three bus bar pairs are associated with three different phases of electrical power that are provided to the bus stack arrangement 710. As such, the bus stack arrangement 710 may be said to include two bus bars 720 per power phase.

Each of the illustrative bus bars 720 has a metallic construction. In the illustrative embodiment, each of the bus bars 720 is formed from copper. In other embodiments, however, each of the bus bars 720 may be formed from another suitable metallic material. In any case, a metallic spacer or donut 712 is disposed between the bus bars 721, 722, a metallic spacer or donut 714 is disposed between the bus bars 723, 724, and a metallic spacer or donut 716 is disposed between the bus bars 725, 726. The spacers 712, 714, 716 have a metallic construction substantially identical to, or otherwise substantially similar to, the bus bars 720.

The illustrative bus stack arrangement 710 includes insulators 730 to provide electrical insulation between multiple conductive bus bars 720 and/or between one of the bus bars 720 and another component (e.g., the metallic bracket 704 and the post 706). In the illustrative embodiment, the insulators 730 includes insulators 731, 732, 733, 734 that are arranged in insulator pairs corresponding to the bus bar pairs. More specifically, the insulators 730 are arranged in a first insulator pair (i.e., 731, 732) corresponding to the first bus bar pair (i.e., 721, 722), a second insulator pair (i.e., 732, 733) corresponding to the second bus bar pair (i.e., 723, 724), and a third insulator pair (i.e., 733, 734) corresponding to the third bus bar pair (i.e., 725, 726). The insulator 732 is arranged between the first and second bus bar pairs and the insulator 733 is arranged between the second and third bus bar pairs. The insulator 731 is arranged between the bracket 704 and the first bus bar pair and the insulator 734 is arranged between the third bus bar pair and the post 706.

In the illustrative embodiment, each of the insulators 730 has a polymeric construction. At least in some embodiments, each of the insulators 730 may be at least partially filled with an electrical insulator, such as glass, for example. Of course, it should be appreciated that in other embodiments, each of the insulators 730 may have another suitable construction and may be at least partially filled with another suitable material.

The illustrative insulators 730 cooperate to define gaps 728 in the vertical direction V" through which conductive components (e.g., the clip assemblies 1200) may extend and through which a foreign object (e.g., an electrical probe) may be inserted such that the foreign object is in proximity to one or more of the bus bars 720. The gaps 728 are defined in substantially identical fashion between projections 738 of adjacent insulators 730. For the sake of simplicity, the gaps 728 defined between the insulators 732, 733 are described in greater detail below.

Each of the insulators 730 includes a main body 736 and at least one projection or safety feature 738 that extends outwardly from the main body 736 along or adjacent to one of the bus bars 720. Whereas the insulators 732, 733 each include four projections or safety features 738, the insulators 731, 734 each include one projection or safety feature 738. The projections 738 of adjacent insulators 730 extend toward one another in the vertical direction V" to define the gaps 728 therebetween that are sized to resist insertion of foreign objects through the gaps 728 such that the inserted foreign objects contact one of the bus bars 720 arranged adjacent the gaps 728. Additionally, the gaps 728 are sized to permit insertion therethrough of conductive components (e.g., the clip assemblies 1200) to establish an electrical connection between the bus bars 720 and an electrical load (e.g., the electrical load 180) through the conductive components.

In the illustrative embodiment, using the adjacent insulators 732, 733 as an example, innermost edges 740 of the projections 738 abut outermost edges 727, 729 of the corresponding bus bars 723, 724 such that the projections 738 are not spaced from the bus bars 723, 724 in a horizontal direction H". Each of the projections 738 of the insulators 732, 733 has a rectangular cross-sectional shape. The projections 738 define generally planar faces 742 that face one another and are arranged in confronting relation to one another. In other embodiments, however, the projections 738 may have another suitable cross-sectional shape and define faces having other suitable geometries.

In the illustrative embodiment, the gaps 728 are defined between the faces 742 of the projections 738 of the adjacent insulators 732, 733. The gaps 728 defined between the projections 738 of the insulators 732, 733 are sized to resist insertion therethrough of a human finger or an electrical probe having a diameter of at least 12 millimeters such that the inserted object contacts one of the bus bars 723, 724 arranged adjacent the gaps 728. Accordingly, in at least some embodiments, the projections 738 are embodied as, or otherwise include, safety features that provide, satisfy, or are otherwise associated with, a predetermined safety standard, for example, the IP20 safety standard or another safety standard. As such, at least in some embodiments, the faces 742 of the adjacent insulators 732, 733 which define the gaps 728 are spaced a distance D1" from one another that is no greater than 12 millimeters. Of course, in other embodiments, the distance D1" may have another suitable value.

Referring now to FIG. 8, an illustrative bus stack arrangement 810 adapted for use in the power panel 102 includes conductive bus bars 820 substantially similar to the bus bars 120 that are spaced from one in a vertical direction V'. It should be appreciated that an orientation 811 of the bus stack arrangement 810 depicted in FIG. 8 differs from an orientation 711 of the bus stack arrangement 710 depicted in FIG. 7. More specifically, in comparison to the bus stack arrangement 710 and the orientation 711 thereof shown in FIG. 7, the bus stack arrangement 810 is rotated approximately 180 degrees about an axis 713 in the orientation 811 shown in FIG. 8.

In the illustrative embodiment, the bus bars 820 include bus bars 821, 822, 823, 824, 825, 826 that extend parallel to one another and are arranged in a first bus bar pair (i.e., 821, 822), a second bus bar pair (i.e., 823, 824), and a third bus bar pair (i.e., 825, 826). The three bus bar pairs are associated with three different phases of electrical power that are provided to the bus stack arrangement 810. As such, the bus stack arrangement 810 may be said to include two bus bars 820 per power phase.

Each of the illustrative bus bars 820 has a metallic construction. In the illustrative embodiment, each of the bus bars 820 is formed from copper. In other embodiments, however, each of the bus bars 820 may be formed from another suitable metallic material. In any case, a metallic spacer or donut 812 is disposed between the bus bars 821, 822, a metallic spacer or donut 814 is disposed between the bus bars 823, 824, and a metallic spacer or donut 816 is disposed between the bus bars 825, 826. The spacers 812, 814, 816 have a metallic construction substantially identical to, or otherwise substantially similar to, the bus bars 820.

The illustrative bus stack arrangement 810 includes insulators 830 to provide electrical insulation between multiple conductive bus bars 820 and/or between one of the bus bars 820 and another component (e.g., the metallic bracket 804 and the post 806). In the illustrative embodiment, the insulators 830 includes insulators 831, 832, 833, 834 that are arranged in insulator pairs corresponding to the bus bar pairs. More specifically, the insulators 830 are arranged in a first insulator pair (i.e., 831, 832) corresponding to the first bus bar pair (i.e., 821, 822), a second insulator pair (i.e., 832, 833) corresponding to the second bus bar pair (i.e., 823, 824), and a third insulator pair (i.e., 833, 834) corresponding to the third bus bar pair (i.e., 825, 826). The insulator 832 is arranged between the first and second bus bar pairs and the insulator 833 is arranged between the second and third bus bar pairs. The insulator 831 is arranged between the bracket 804 and the first bus bar pair and the insulator 834 is arranged between the third bus bar pair and the post 806.

In the illustrative embodiment, each of the insulators 830 has a polymeric construction. At least in some embodiments, each of the insulators 830 may be at least partially filled with an electrical insulator, such as glass, for example. Of course, it should be appreciated that in other embodiments, each of the insulators 830 may have another suitable construction and may be at least partially filled with another suitable material.

The illustrative insulators 830 cooperate to define gaps 828 in the vertical direction V''' through which conductive components (e.g., the clip assemblies 1200) may extend and through which a foreign object (e.g., an electrical probe) may be inserted such that the foreign object is in proximity to one or more of the bus bars 820. The gaps 828 are defined in substantially identical fashion between projections 838 of adjacent insulators 830. For the sake of simplicity, the gaps 828 defined between the insulators 832, 833 are described in greater detail below.

Each of the insulators 830 includes a main body 836 and at least one projection or safety feature 838 that extends outwardly from the main body 836 along or adjacent to one of the bus bars 820. Whereas the insulators 832, 833 each include four projections or safety features 838, the insulators 831, 834 each include one projection or safety feature 838. The projections 838 of adjacent insulators 830 extend toward one another in the vertical direction V''' to define the gaps 828 therebetween that are sized to resist insertion of foreign objects through the gaps 828 such that the inserted foreign objects contact one of the bus bars 820 arranged adjacent the gaps 828. Additionally, the gaps 828 are sized to permit insertion therethrough of conductive components (e.g., the clip assemblies 1200) to establish an electrical connection between the bus bars 820 and an electrical load (e.g., the electrical load 180) through the conductive components.

In the illustrative embodiment, using the adjacent insulators 832, 833 as an example, the projections 838 are spaced from outermost edges 827, 829 of the corresponding bus bars 823, 824 in a horizontal direction H'''. Each of the projections 838 of the insulators 832, 833 has a rectangular cross-sectional shape. The projections 838 define generally planar faces 842 that face one another and are arranged in confronting relation to one another. In other embodiments, however, the projections 838 may have another suitable cross-sectional shape and define faces having other suitable geometries.

In the illustrative embodiment, the gaps 828 are defined between the faces 842 of the projections 838 of the adjacent insulators 832, 833. The gaps 828 defined between the projections 838 of the insulators 832, 833 are sized to resist insertion therethrough of a human finger or an electrical probe having a diameter of at least 12 millimeters such that the inserted object contacts one of the bus bars 823, 824 arranged adjacent the gaps 828. Accordingly, in at least some embodiments, the projections 838 are embodied as, or otherwise include, safety features that provide, satisfy, or are otherwise associated with, a predetermined safety standard, for example, the IP20 safety standard or another safety standard. As such, at least in some embodiments, the faces 842 of the adjacent insulators 832, 833 which define the gaps 828 are spaced a distance D1''' from one another that is no greater than 12 millimeters. Of course, in other embodiments, the distance D1''' may have another suitable value.

Figure 9:
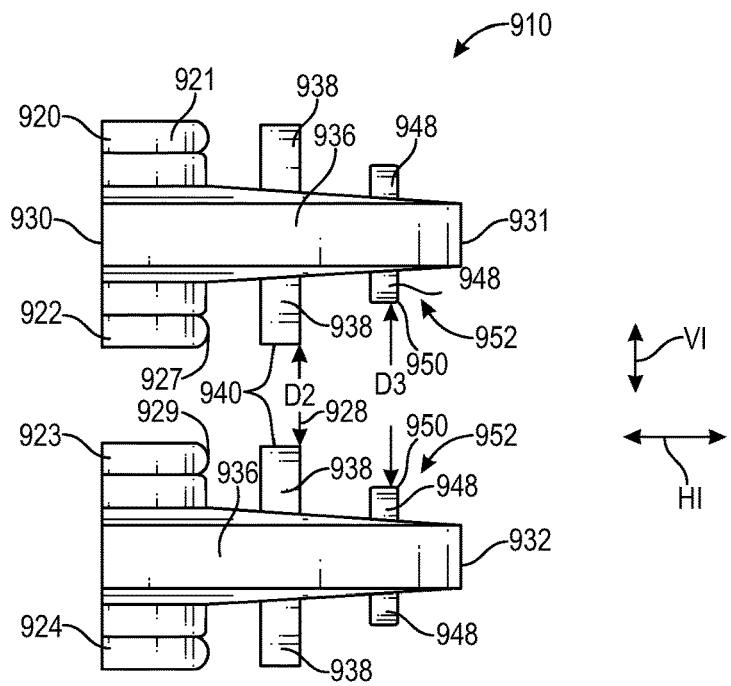
FIG. 9 is a magnified view of a portion of a fifth bus stack arrangement incorporating safety features that is adapted for use in the power panel depicted in FIG. 1.

Referring now to FIG. 9, an illustrative bus stack arrangement 910 adapted for use in the power panel 102 includes conductive bus bars 920 substantially similar to the bus bars 120 that are spaced from one in a vertical direction V1. The arrangement of the bus bars 920 may be substantially similar to the aforementioned arrangement of the bus bars 120 such that the bus bars 920 extend parallel to one another and are arranged in three bus bar pairs associated with three different phases of electrical power. For the sake of simplicity, however, the bus bars 920 depicted in FIG. 9 include bus bars 921, 922, 923, 924 arranged in a first bus bar pair (i.e., 921, 922) and a second bus bar pair (i.e., 923, 924).

Each of the illustrative bus bars 920 has a metallic construction. In the illustrative embodiment, each of the bus bars 920 is formed from copper. In other embodiments, however, each of the bus bars 920 may be formed from another suitable metallic material. Although not shown, it should be appreciated that metallic spacers or donuts may be disposed between the bus bars 921, 922, 923, 924 in similar fashion to the arrangement of the donuts 112, 114, 116 relative to the bus bars 121, 122, 123, 124, 125, 126 in the bus stack arrangement 110.

The illustrative bus stack arrangement 910 includes insulators 930 to provide electrical insulation between multiple conductive bus bars 920 and/or between one of the bus bars 920 and another component. The arrangement of the insulators 930 may be substantially similar to the aforementioned arrangement of the insulators 130 such that the insulators 930 are arranged in insulator pairs corresponding to the bus bar pairs. For the sake of simplicity, however, the insulators 930 depicted in FIG. 9 include an insulator 931 arranged between the bus bars 921, 922 and an insulator 932 arranged between the bus bars 923, 924.

In the illustrative embodiment, each of the insulators 930 has a polymeric construction. At least in some embodiments, each of the insulators 930 may be at least partially filled with an electrical insulator, such as glass, for example. Of course, it should be appreciated that in other embodiments, each of the insulators 930 may have another suitable construction and may be at least partially filled with another suitable material.

The illustrative insulators 930 cooperate to define gaps 928 in the vertical direction V1 through which conductive components (e.g., the clip assemblies 1200) may extend and through which a foreign object (e.g., an electrical probe) may be inserted such that the foreign object is in proximity to one or more of the bus bars 920. The gaps 928 are defined in substantially identical fashion between projections 938 of adjacent insulators 930. It should be appreciated that the gaps 928 depicted in FIG. 9 correspond to gaps 928 defined adjacent one side of the bus stack arrangement 910. Of course, similar to the bus stack arrangement 110, the gaps 928 may also be defined adjacent another side of the bus stack arrangement 910 that is arranged substantially opposite the one side. In any case, for the sake of simplicity, only the gap 928 defined between the projections 938 of the adjacent insulators 931, 932 is described in greater detail below.

Each of the insulators 931, 932 includes a main body 936 and at least one projection or safety feature 938 that extends outwardly from the main body 936. The projections 938 of the insulators 931, 932 extend toward one another in the vertical direction V1 to define the gap 928 therebetween that is sized to resist insertion of foreign objects therethrough such that the inserted foreign objects contact one of the bus bars 922, 923 arranged adjacent the gap 928. Additionally, the gap 928 is sized to permit insertion therethrough of a conductive component (e.g., one of the clip assemblies 1200) to establish an electrical connection between the bus bars 920 and an electrical load (e.g., the electrical load 180) through the conductive component.

In the illustrative embodiment, the projections 938 are spaced from outermost edges 927, 929 of the corresponding bus bars 922, 923 in a horizontal direction H1. Each of the projections 938 of the insulators 931, 932 has a rectangular cross-sectional shape. The projections 938 define generally planar faces 940 that face one another and are arranged in confronting relation to one another to define the gap 928. In other embodiments, however, the projections 938 may have another suitable cross-sectional shape and define faces having other suitable geometries.

In the illustrative embodiment, the gap 928 defined between the faces 940 of the projections 938 of the adjacent insulators 931, 932 is sized to resist insertion therethrough of a human finger or an electrical probe having a diameter of at least 12 millimeters such that the inserted object contacts one of the bus bars 922, 923 arranged adjacent the gap 928. Accordingly, in at least some embodiments, the projections 938 are embodied as, or otherwise include, safety features that provide, satisfy, or are otherwise associated with, a predetermined safety standard, for example, the IP20 safety standard or another safety standard. As such, at least in some embodiments, the faces 940 of the adjacent insulators 931, 932 which define the gap 928 are spaced a distance D2 from one another that is no greater than 12 millimeters. Of course, in other embodiments, the distance D2 may have another suitable value.

The insulators 931, 932 include ancillary projections 948 that are spaced from the projections 938 in the horizontal direction H1 and extend outwardly away from the main body 936 of the insulators 931, 932. As depicted in FIG. 9, the projections 938 and the ancillary projections 948 are formed on the same side 952 of each of the insulators 931, 932. In the illustrative embodiment, the ancillary projections 948 of each insulator 931, 932 are located exteriorly of the projections 938 relative to a center (not shown) of the bus stack arrangement 910. Additionally, in the illustrative embodiment, the ancillary projections 948 of each insulator 931, 932 extend outwardly from the main body 936 to a lesser extent than the projections 938. Consequently, the ancillary projections 948 of the adjacent insulators 931, 932 are spaced from one another in the vertical direction V1 by an illustrative distance D3 that is greater than the distance D2.

At least in some embodiments, in cooperation with the projections 938, the ancillary projections 948 may resist insertion of a human finger or an electrical probe having a diameter of at least 12 millimeters through the gap 928 such that the inserted object contacts one of the bus bars 922, 923 arranged adjacent the gap 928. Accordingly, at least in some embodiments, the ancillary projections 948 may be embodied as, or otherwise include, safety features that facilitate attainment of a predetermined safety standard, for example, the IP20 safety standard or another safety standard, in cooperation with the projections 938.

In the illustrative embodiment, each of the ancillary projections 948 of the insulators 931, 932 has a rectangular cross-sectional shape. The ancillary projections 948 define generally planar faces 950 that face one another and are arranged in confronting relation to one another. In other embodiments, however, the ancillary projections 948 may have another suitable cross-sectional shape and define faces having other suitable geometries.

Figure 10:
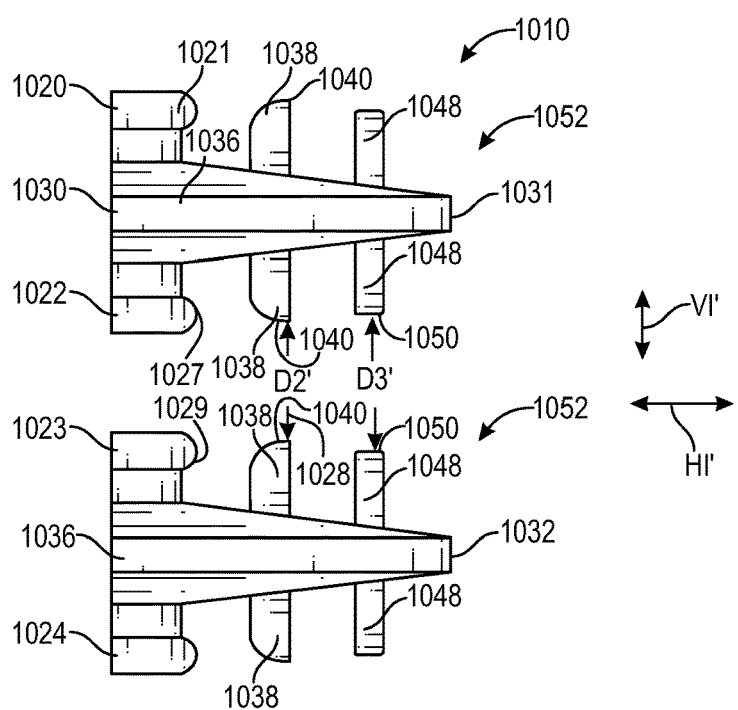
FIG. 10 is a magnified view of a portion of a sixth bus stack arrangement incorporating safety features that is adapted for use in the power panel depicted in FIG. 1.

Referring now to FIG. 10, an illustrative bus stack arrangement 1010 adapted for use in the power panel 102 includes conductive bus bars 1020 substantially similar to the bus bars 120 that are spaced from one in a vertical direction V1'. The arrangement of the bus bars 1020 may be substantially similar to the aforementioned arrangement of the bus bars 120 such that the bus bars 1020 extend parallel to one another and are arranged in three bus bar pairs associated with three different phases of electrical power. For the sake of simplicity, however, the bus bars 1020 depicted in FIG. 10 include bus bars 1021, 1022, 1023, 1024 arranged in a first bus bar pair (i.e., 1021, 1022) and a second bus bar pair (i.e., 1023, 1024).

Each of the illustrative bus bars 1020 has a metallic construction. In the illustrative embodiment, each of the bus bars 1020 is formed from copper. In other embodiments, however, each of the bus bars 1020 may be formed from another suitable metallic material. Although not shown, it should be appreciated that metallic spacers or donuts may be disposed between the bus bars 1021, 1022, 1023, 1024 in similar fashion to the arrangement of the donuts 112, 114, 116 relative to the bus bars 121, 122, 123, 124, 125, 126 in the bus stack arrangement 110.

The illustrative bus stack arrangement 1010 includes insulators 1030 to provide electrical insulation between multiple conductive bus bars 1020 and/or between one of the bus bars 1020 and another component. The arrangement of the insulators 1030 may be substantially similar to the aforementioned arrangement of the insulators 130 such that the insulators 1030 are arranged in insulator pairs corresponding to the bus bar pairs. For the sake of simplicity, however, the insulators 1030 depicted in FIG. 10 include an insulator 1031 arranged between the bus bars 1021, 1022 and an insulator 1032 arranged between the bus bars 1023, 1024.

In the illustrative embodiment, each of the insulators 1030 has a polymeric construction. At least in some embodiments, each of the insulators 1030 may be at least partially filled with an electrical insulator, such as glass, for example. Of course, it should be appreciated that in other embodiments, each of the insulators 1030 may have another suitable construction and may be at least partially filled with another suitable material.

The illustrative insulators 1030 cooperate to define gaps 1028 in the vertical direction V1' through which conductive components (e.g., the clip assemblies 1200) may extend and through which a foreign object (e.g., an electrical probe) may be inserted such that the foreign object is in proximity to one or more of the bus bars 1020. The gaps 1028 are defined in substantially identical fashion between projections 1038 of adjacent insulators 1030. It should be appreciated that the gaps 1028 depicted in FIG. 10 correspond to gaps 1028 defined adjacent one side of the bus stack arrangement 1010. Of course, similar to the bus stack arrangement 110, the gaps 1028 may also be defined adjacent another side of the bus stack arrangement 1010 that is arranged substantially opposite the one side. In any case, for the sake of simplicity, only the gap 1028 defined between the projections 1038 of the adjacent insulators 1031, 1032 is described in greater detail below.

Each of the insulators 1031, 1032 includes a main body 1036 and at least one projection or safety feature 1038 that extends outwardly from the main body 1036. The projections 1038 of the insulators 1031, 1032 extend toward one another in the vertical direction V1' to define the gap 1028 therebetween that is sized to resist insertion of foreign objects therethrough such that the inserted foreign objects contact one of the bus bars 1022, 1023 arranged adjacent the gap 1028. Additionally, the gap 1028 is sized to permit insertion therethrough of a conductive component (e.g., one of the clip assemblies 1200) to establish an electrical connection between the bus bars 1020 and an electrical load (e.g., the electrical load 180) through the conductive component.

In the illustrative embodiment, the projections 1038 are spaced from outermost edges 1027, 1029 of the corresponding bus bars 1022, 1023 in a horizontal direction H1'. Each of the projections 1038 is illustratively embodied as, or otherwise includes, a fin-shaped projection having an arcuate tip 1040. The arcuate tips 1040 of the projections 1038 of the adjacent insulators 1031, 1032 face one another and are arranged in confronting relation to one another to define the gap 1028. In other embodiments, however, the projections 1038 may be embodied as, or otherwise include, projections having another suitable shape.

In the illustrative embodiment, the gap 1028 defined between the arcuate tips 1040 of the projections 1038 of the adjacent insulators 1031, 1032 is sized to resist insertion therethrough of a human finger or an electrical probe having a diameter of at least 12 millimeters such that the inserted object contacts one of the bus bars 1022, 1023 arranged adjacent the gap 1028. Accordingly, in at least some embodiments, the projections 1038 are embodied as, or otherwise include, safety features that provide, satisfy, or are otherwise associated with, a predetermined safety standard, for example, the IP20 safety standard or another safety standard. As such, at least in some embodiments, the arcuate tips 1040 of the adjacent insulators 1031, 1032 which define the gap 1028 are spaced a distance D2' from one another that is no greater than 12 millimeters. Of course, in other embodiments, the distance D2' may have another suitable value.

The insulators 1031, 1032 include ancillary projections 1048 that are spaced from the projections 1038 in the horizontal direction H1' and extend outwardly away from the main body 1036 of the insulators 1031, 1032. As depicted in FIG. 10, the projections 1038 and the ancillary projections 1048 are formed on the same side 1052 of each of the insulators 1031, 1032. In the illustrative embodiment, the ancillary projections 1048 of each insulator 1031, 1032 are located exteriorly of the projections 1038 relative to a center (not shown) of the bus stack arrangement 1010. Additionally, in the illustrative embodiment, the ancillary projections 1048 of each insulator 1031, 1032 extend outwardly from the main body 1036 to a lesser extent than the projections 1038. Consequently, the ancillary projections 1048 of the adjacent insulators 1031, 1032 are spaced from one another in the vertical direction V1' by an illustrative distance D3' that is greater than the distance D2'.

At least in some embodiments, in cooperation with the projections 1038, the ancillary projections 1048 may resist insertion of a human finger or an electrical probe having a diameter of at least 12 millimeters through the gap 1028 such that the inserted object contacts one of the bus bars 1022, 1023 arranged adjacent the gap 1028. Accordingly, at least in some embodiments, the ancillary projections 1048 may be embodied as, or otherwise include, safety features that facilitate attainment of a predetermined safety standard, for example, the IP20 safety standard or another safety standard, in cooperation with the projections 1038.

In the illustrative embodiment, each of the ancillary projections 1048 of the insulators 1031, 1032 has a rectangular cross-sectional shape. The ancillary projections 1048 define generally planar faces 1050 that face one another and are arranged in confronting relation to one another. In other embodiments, however, the ancillary projections 1048 may have another suitable cross-sectional shape and define faces having other suitable geometries.

Referring back to FIG. 9 and FIG. 10, it should be appreciated that the insulators 930, 1030 may incorporate additional features and/or have alternative geometries that, in combination with the projections 938, 1038, further facilitate attainment of a predetermined safety rating, such as an IP-20 safety rating, for example. In some embodiments, the insulators 930, 1030 (e.g., the main bodies 936, 1036 of the insulators 931, 932, 1031, 1032) may be lengthened and/or enlarged in the horizontal directions H1, H1' and/or the vertical directions V1, V1' such that the insulators 930 define gaps (not shown) sized to resist passage therethrough of some portion of an electrical probe (e.g., a portion of the probe 590 having a greater diameter than the tip 592) or a human hand. In such embodiments, the main bodies 936, 1036 and the projections 938, 1038 of the insulators 930, 1030 may cooperatively provide, or otherwise be characterized as, safety features. In other embodiments, however, the insulators 930, 1030 may incorporate additional features and/or have alternative geometries that, independent of the inclusion of the projections 938, 1038, facilitate attainment of a predetermined safety rating, such as an IP-20 safety rating, for example.

Figure 11:
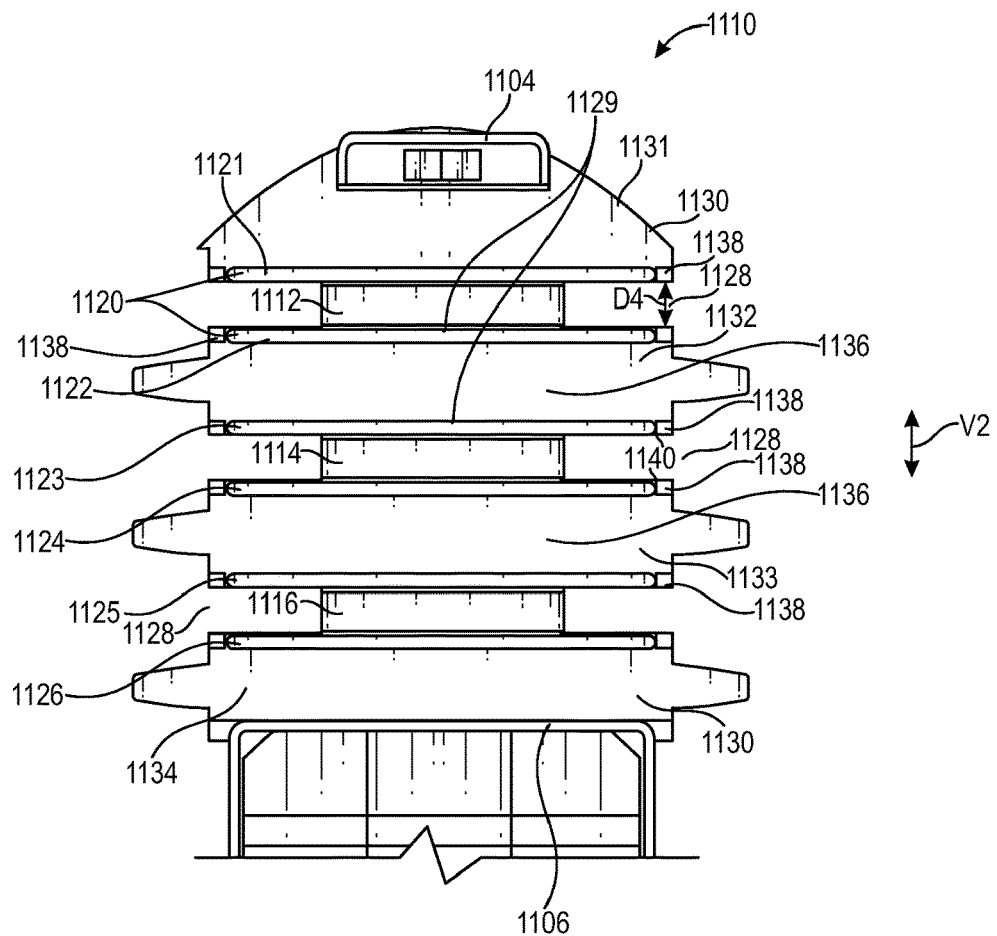
FIG. 11 is a partial sectional view of a seventh bus stack arrangement incorporating safety features that is adapted for use in the power panel depicted in FIG. 1.

Referring now to FIG. 11, an illustrative bus stack arrangement 1110 adapted for use in the power panel 102 includes conductive bus bars 1120 substantially similar to the bus bars 120 that are spaced from one in a vertical direction V2. In the illustrative embodiment, the bus bars 1120 include bus bars 1121, 1122, 1123, 1124, 1125, 1126 that extend parallel to one another and are arranged in a first bus bar pair (i.e., 1121, 1122), a second bus bar pair (i.e., 1123, 1124), and a third bus bar pair (i.e., 1125, 1126). The three bus bar pairs are associated with three different phases of electrical power that are provided to the bus stack arrangement 1110. As such, the bus stack arrangement 1110 may be said to include two bus bars 1120 per power phase.

Each of the illustrative bus bars 1120 has a metallic construction. In the illustrative embodiment, each of the bus bars 1120 is formed from copper. In other embodiments, however, each of the bus bars 1120 may be formed from another suitable metallic material. In any case, a metallic spacer or donut 1112 is disposed between the bus bars 1121, 1122, a metallic spacer or donut 1114 is disposed between the bus bars 1123, 1124, and a metallic spacer or donut 1116 is disposed between the bus bars 1125, 1126. The spacers 1112, 1114, 1116 have a metallic construction substantially identical to, or otherwise substantially similar to, the bus bars 1120.

The illustrative bus stack arrangement 1110 includes insulators 1130 to provide electrical insulation between multiple conductive bus bars 1120 and/or between one of the bus bars 1120 and another component (e.g., one of the metallic brackets 1104, 1106). In the illustrative embodiment, the insulators 1130 includes insulators 1131, 1132, 1133, 1134 that are arranged in insulator pairs corresponding to the bus bar pairs. More specifically, the insulators 1130 are arranged in a first insulator pair (i.e., 1131, 1132) corresponding to the first bus bar pair (i.e., 1121, 1122), a second insulator pair (i.e., 1132, 1133) corresponding to the second bus bar pair (i.e., 1123, 1124), and a third insulator pair (i.e., 1133, 1134) corresponding to the third bus bar pair (i.e., 1125, 1126). The insulator 1132 is arranged between the first and second bus bar pairs and the insulator 1133 is arranged between the second and third bus bar pairs. The insulator 1131 is arranged between the bracket 1104 and the first bus bar pair and the insulator 1134 is arranged between the third bus bar pair and the bracket 1106.

In the illustrative embodiment, each of the insulators 1130 has a polymeric construction. At least in some embodiments, each of the insulators 1130 may be at least partially filled with an electrical insulator, such as glass, for example. Of course, it should be appreciated that in other embodiments, each of the insulators 1130 may have another suitable construction and may be at least partially filled with another suitable material.

The illustrative insulators 1130 cooperate to define gaps 1128 in the vertical direction V2 through which conductive components (e.g., the clip assemblies 1200) may extend and through which a foreign object (e.g., an electrical probe) may be inserted such that the foreign object is in proximity to one or more of the bus bars 1120, as further discussed below. The gaps 1128 are defined in substantially identical fashion between projections 1138 of adjacent insulators 1130.

Each of the insulators 1130 includes a main body 1136 and at least one projection or safety feature 1138 that extends outwardly from the main body 1136 along or adjacent to one of the bus bars 1120. In the illustrative embodiment, leading edges 1129 of the bus bars 1120 are nested into the safety features 1138 such that the safety features 1138 at least partially cover the leading edges 1129. In at least some embodiments, the bus bars 1120 may be at least partially embedded in the safety features 1138.

The illustrative projections 1138 of adjacent insulators 1130 extend toward one another in the vertical direction V2 to define the gaps 1128 therebetween that are sized to resist insertion of foreign objects through the gaps 1128 such that the inserted foreign objects contact one of the bus bars 1120 arranged adjacent the gaps 1128. Additionally, the gaps 1128 are sized to permit insertion therethrough of conductive components (e.g., the clip assemblies 1200) to establish an electrical connection between the bus bars 1120 and an electrical load (e.g., the electrical load 180) through the conductive components.

In the illustrative embodiment, each of the projections 1138 of the insulators 1130 has a rectangular cross-sectional shape. The projections 1138 of adjacent insulators 1130 define generally planar faces 1140 that face one another and are arranged in confronting relation to one another. In other embodiments, however, the projections 1138 may have another suitable cross-sectional shape and define faces having other suitable geometries.

In the illustrative embodiment, the gaps 1128 are defined between the faces 1140 of the projections 1138 of the adjacent insulators 1130. The gaps 1128 defined between the projections 1138 of the adjacent insulators 1130 are sized to resist insertion therethrough of a human finger or an electrical probe having a diameter of at least 12 millimeters such that the inserted object contacts one of the bus bars 1120 arranged adjacent the gaps 1128. Accordingly, in at least some embodiments, the projections 1138 are embodied as, or otherwise include, safety features that provide, satisfy, or are otherwise associated with, a predetermined safety standard, for example, the IP20 safety standard or another safety standard. As such, at least in some embodiments, the faces 1140 of the adjacent insulators 1131, 1132 which define the gaps 1128 are spaced a distance D4 from one another that is no greater than 12 millimeters. Of course, in other embodiments, the distance D4 may have another suitable value.

Figure 12:
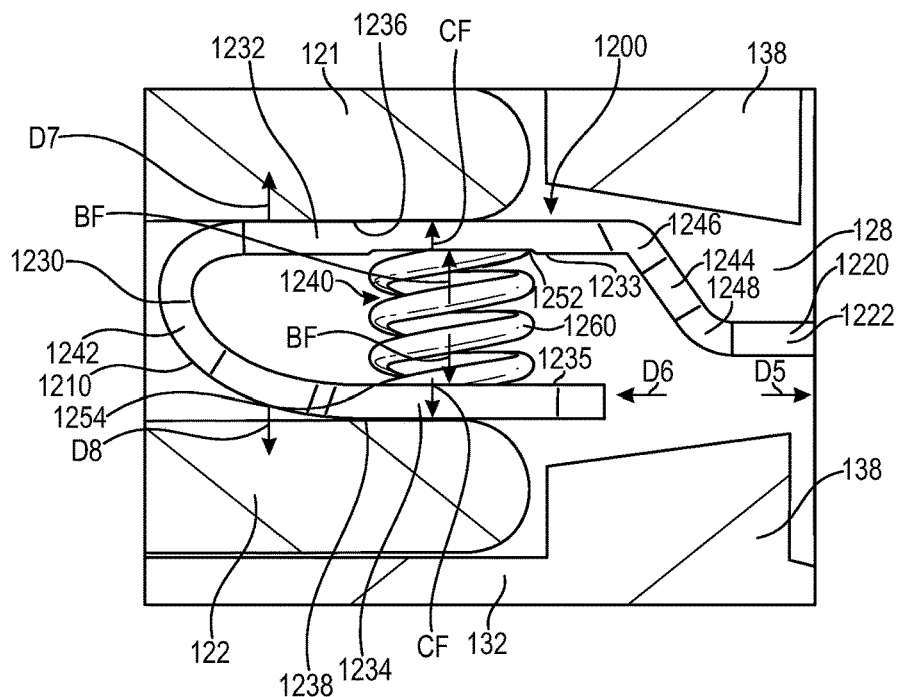
FIG. 12 is a magnified view of a conductive clip assembly included in the power panel depicted in FIG. 1 and adapted for use with any of the aforementioned bus stack arrangements.

Referring now to FIG. 12, one of the electrically conductive clip assemblies 1200 coupled to the bus bars 120 and the at least one electrical load 180 to establish an electrical connection between multiple bus bars 120 is shown in greater detail. Although the clip assembly 1200 is described in greater detail below with reference to the bus stack arrangement 110, it should be appreciated that the clip assembly 1200 is adapted for use with any one of the bus stack arrangements 410, 710, 810, 910, 1010, 1110 discussed above. When used in one of the bus stack arrangements 110, 410, 710, 810, 910, 1010, 1110, it should be appreciated that multiple clip assemblies 1200 are used to electrically couple the bus bars (e.g., the bus bars 120) to the electrical load (e.g., the electrical load 180) as shown in FIG. 1. More specifically, in at least some embodiments, three clip assemblies 1200 may each be arranged in contact with one of three bus bar pairs (e.g., one of the three pairs of bus bars 120) to electrically couple the bus bars to the electrical load.

The illustrative clip assembly 1200 includes a metallic clip 1210 having a tang 1220 and a C-shaped section 1230 interconnected with the tang 1220. Additionally, the clip assembly 1200 includes a biasing element 1260 coupled to the clip 1210. In the illustrative embodiment, the tang 1220 interacts with (e.g., is coupled to) a component of the electrical load 180, such as a connective device thereof, for example. The illustrative C-shaped section 1230 is positioned between the conductive bus bars 121, 122 and the biasing element 1260 is positioned between legs 1232, 1234 of the C-shaped section 1230 to apply a biasing force BF to each leg 1232, 1234 that urges each leg 1232, 1234 in contact with one of the bus bars 121, 122.

When the clip assembly 1200 is installed in a power panel (e.g., the power panel 102) as shown in FIG. 1, the biasing element 1260 urges the legs 1232, 1234 of the C-shaped section 1230 in contact with the bus bars 121, 122 to facilitate establishment of an electrical connection between the bus stack arrangement 110 and the electrical load 180. The biasing forces BF applied to the C-shaped section 1230 by the biasing element 1260 enable application of contact forces CF to the bus bars 121, 122 by the corresponding legs 1232, 1234 such that consistent contact between the legs 1232, 1234 and the bus bars 121, 122 may be attained in use of the power panel. Such contact may be achieved despite some degree of misalignment between the C-shaped section 1230 and the bus bars 121, 122. Additionally, that contact may be largely achieved regardless of the entry angle and/or orientation of the C-shaped section 1230 in the gap 128.

For the purposes of the present disclosure, it should be appreciated that each clip assembly may have a configuration different from the illustrative assembly 1200 depicted in FIG. 12. In one example, multiple clips (e.g., two clips 1210) may be arranged adjacent one another (e.g., stacked in a vertical direction or positioned side-by-side) in each gap (e.g., the gap 128), and one biasing element (e.g., one element 1260) may be arranged such that the biasing element biases each one of the clips into engagement with one of the bus bars adjacent the gap (e.g., the bus bars 121, 122) when the assembly is installed in the gap. In another example, multiple biasing elements (e.g., two biasing elements 1260) may be arranged adjacent one another (e.g., stacked in a vertical direction or positioned side-by-side) in a single clip (e.g., the clip 1210) such that the biasing elements cooperatively bias portions (e.g., the legs 1232, 1234) of the clip into engagement with one of the bus bars adjacent the gap when the assembly is installed in the gap. Of course, additional configurations of each clip assembly are contemplated by, and within the spirit of, the present disclosure.

For the purposes of the present disclosure, alternate terminology may be used to describe various features of the clip assembly 1200 and the clip 1210, among other things. In one example, the tang 1220 may be referred to herein as a load-side clip portion 1220 that extends in a load-side direction D5 and includes a load-side contact surface 1222 that is structured to conductively couple the clip 1210 with the electrical load 180. In another example, the C-shaped section 1230 may be described herein as including (i) a first line-side clip portion (analogous to one of the legs 1232, 1234) extending in a line-side direction D6 and conductively coupled with the load-side clip portion 1220 and (ii) a second line-side clip portion (analogous to the other of the legs 1232, 1234) extending in the line-side direction D6 and conductively coupled with the load-side clip portion 1220. The first line-side clip portion 1232 may include a first bus bar contact surface 1236 that faces an outer direction D7, and the second line-side clip portion 1234 may include a second bus bar contact surface 1238 that faces an outer direction D8 different from the outer direction D7. The second line-side clip portion 1234 may be spaced apart from the first line-side clip portion 1232 to define a gap 1240 extending between a first inner surface 1233 of the first line-side clip portion 1232 and a second inner surface 1235 of the second line-side clip portion 1234. The biasing element 1260 may be described herein as a compression spring 1260 that is positioned in the gap 1240 and extends between the first inner surface 1233 of the first line-side clip portion 1232 and the second inner surface 1235 of the second line-side clip portion 1234.

In the illustrative embodiment, the legs or line-side clip portions 1232, 1234 are coupled to one another by a curved line-side clip portion 1242. In cooperation with one another, the clip portions 1232, 1234, 1242 define the C-shape of the C-shaped section 1230. Due at least in part to that arrangement, the line-side clip portions 1232, 1234 are arranged substantially, or at least generally, parallel to one another.

Each of the illustrative bus bar contact surfaces 1236, 1238 is a substantially planar surface. Additionally, as a consequence of the arrangement of the line-side clip portions 1232, 1234, the bus bar contact surfaces 1236, 1238 are arranged substantially parallel to one another.

In the illustrative embodiment, the C-shaped section 1230 (i.e., the line-side clip portion 1232) is interconnected with the tang or load-side clip portion 1220 by a transition section 1244 of the clip 1210. The transition section 1244 includes a convex portion 1246 and a concave portion 1248 interconnected with the convex portion 1246. The C-shaped section 1230, the transition section 1244, and the load-side clip portion 1220 are illustratively integrally formed. Therefore, the illustrative clip 1210 is an integrally formed component.

The illustrative legs or line-side clip portions 1232, 1234 are formed to include corresponding recesses 1252, 1254. It should be appreciated that the recesses 1252, 1254 may each include, or otherwise be embodied as, an indentation, a notch, a groove, a channel, or the like. The recess 1252 formed in the line-side clip portion 1232 is defined at least in part by the generally planar inner surface 1233 thereof, which may be referred to herein as an engagement surface. The recess 1254 formed in the line-side clip portion 1234 is defined at least in part by the generally planar inner surface 1235 thereof, which also may be referred to herein as an engagement surface. In the illustrative embodiment, the inner or engagement surfaces 1233, 1235 face one another and are arranged in confronting relation to one another.

When the illustrative clip assembly 1200 is assembled and installed in the power panel (e.g., the power panel 102), the biasing element 1260 extends into the recesses 1252, 1254 and contacts the engagement surfaces 1233, 1235 of the line-side clip portions 1232, 1234 to bias the portions 1232, 1234 outwardly into engagement with the bus bars 121, 122. Said another way, when the clip assembly 1200 is assembled and installed in the gap 128, the biasing element 1260 exerts force in (i) the direction D7 that pushes the bus bar contact surface 1236 against the bus bar 121 and in (ii) the direction D8 that pushes the bus bar contact surface 1238 against the bus bar 122.

It should be appreciated that the clip 1210 (i.e., with or without the biasing element 1260 positioned therein) is slideable into and out of the gap 128 defined between the bus bars 121, 122. When the clip assembly 1200 is assembled and installed in the power panel in the gap 128, the biasing element 1260 applies the biasing forces BF to each of the legs 1232, 1234 of the C-shaped section 1230 of the clip 1210 that is independent of force applied by an orientation of the C-shaped section 1230 relative to the bus bars 121, 122 and independent of force applied by, or otherwise associated with, deformation of the clip assembly 1200. When the assembled clip assembly 1200 is removed from the gap 128, the biasing element 1260 is in a state of compression in which the biasing element 1260 exerts the biasing forces BF on the inner surfaces 1233, 1235 of the line-side clip portions 1232, 1234.

In the illustrative embodiment, the biasing element 1260 is embodied as, or otherwise includes, a coiled compression spring. In other embodiments, the biasing element 1260 may be embodied as, or otherwise include, another suitable device. In such embodiments, the biasing element 1260 may be embodied as, or otherwise include, a helical spring, a spiral spring, a leaf spring, a wave spring, a Belleville spring, a serpentine spring, a garter spring, or the like.

Referring now to FIG. 13, an illustrative method 1300 of servicing the power panel 102 may be performed manually (e.g., by an operator) or automatically (e.g., by a robot under control by a controller). The method 1300 corresponds to, or is otherwise associated with, performance of the blocks described below in the illustrative sequence of FIG. 13. It should be appreciated, however, that the method 1300 may be performed in one or more sequences different from the illustrative sequence.

The illustrative method 1300 begins with block 1302. In block 1302, access to the bus stack arrangement (e.g., one of the bus stack arrangements 110, 410, 710, 810, 910, 1010, 1110) of the power panel 102 is obtained. To obtain access to the bus stack arrangement in block 1302, block 1304 is performed. In block 1304, access is obtained to the bus stack arrangement such that adjacent projections/safety features of the insulators (e.g., the safety features 138 of adjacent insulators 130, the safety features 438 of adjacent insulators 430, the safety features 738 of adjacent insulators 730, the safety features 838 of adjacent insulators 830, the safety features 938 of adjacent insulators 930, the safety features 1038 of adjacent insulators 1030, the safety features 1138 of adjacent insulators 1130) prevent contact between a finger of the user and one of multiple bus bars (e.g., one of the bus bars 120, 420, 720, 820, 920, 1020, 1120) arranged in close proximity to the adjacent projections/safety features through a gap (e.g., the gap 128, 428, 728, 828, 928, 1028, 1128) defined between the adjacent projections/safety features. Upon completion of block 1304 and therefore block 1302, the method 1300 subsequently proceeds to block 1306.

In block 1306 of the illustrative method 1300, an electrical probe (e.g., the probe 590) is positioned adjacent to the gap (e.g., the gap 128, 428, 728, 828, 928, 1028, 1128) defined vertically between adjacent insulators. From block 1306, the method 1300 subsequently proceeds to block 1308.

In block 1308 of the illustrative method 1300, the electrical probe is inserted through the gap toward a space (e.g., one of the vertical spaces between the bus bars 120, 420,

720, 820, 920, 1020, 1120) defined between multiple bus bars. From block 1308, the method 1300 subsequently proceeds to block 1310.

In block 1310 of the illustrative method 1300, at least one of the safety features/projections of the adjacent insulators is contacted with the electrical probe to resist contact between the electrical probe and one of the multiple bus bars through the gap. To do so, block 1312 is performed. In block 1312, the at least one of the safety features/projections is contacted with the electrical probe such that a tip (e.g., the tip 592) is spaced from each of the multiple bus bars arranged adjacent the gap.

Figure 14:
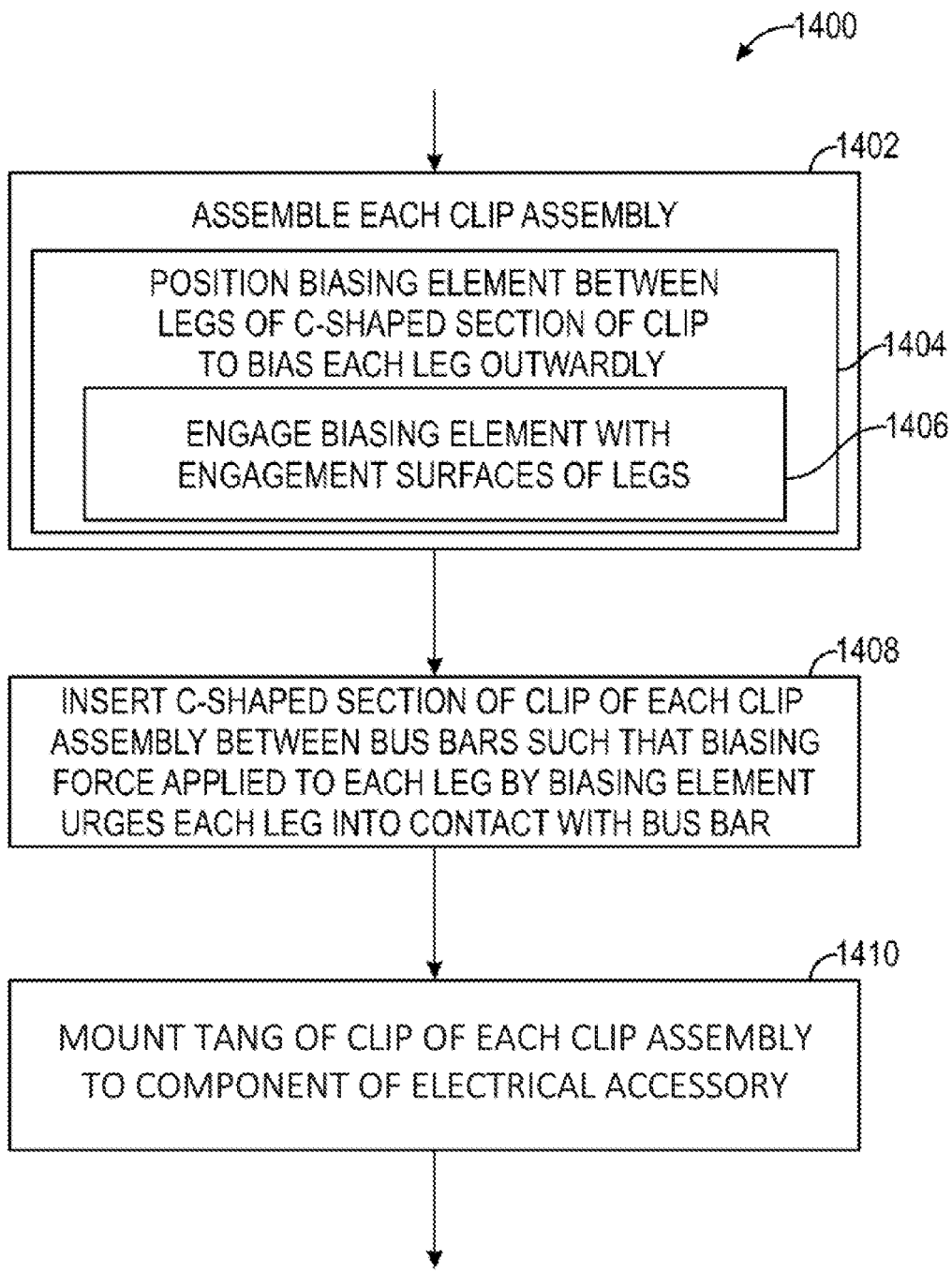
FIG. 14 is a simplified flowchart of a method of assembling the power panel of FIG. 1.

Referring now to FIG. 14, an illustrative method 1400 of assembling the power panel 102 may be performed manually (e.g., by an operator) or automatically (e.g., by a robot under control by a controller). The method 1400 corresponds to, or is otherwise associated with, performance of the blocks described below in the illustrative sequence of FIG. 14. It should be appreciated, however, that the method 1400 may be performed in one or more sequences different from the illustrative sequence.

The illustrative method 1400 begins with block 1402. In block 1402, each clip assembly (e.g., each of the clip assemblies 1200) is assembled. To assemble each clip assembly in block 1402, block 1404 is performed. In block 1404, the biasing element (e.g., the biasing element 1260) is positioned between the legs (e.g., the legs 1232, 1234) of the C-shaped section (e.g., the C-shaped section 1230) of each clip (e.g., the clip 1210) to apply a biasing force (e.g., the biasing force BF) to each leg that urges each leg outwardly (e.g., in the directions D7, D8). To perform block 1404, block 1406 is performed. In block 1406, the biasing element is engaged with engagement surfaces (e.g., the engagement surfaces 1233, 1235) of the legs. It should be appreciated that to perform block 1406, the biasing element is inserted into the recesses (e.g., the recesses 1252, 1254) formed in the legs. In any case, upon completion of blocks 1404 and 1406 and therefore block 1402, the method 1400 subsequently proceeds to block 1408.

In block 1408 of the illustrative method 1400, the C-shaped section of the clip of each clip assembly is inserted through the gap (e.g., the gap 128, 428, 728, 828, 928, 1028, 1128) and between adjacent bus bars (e.g., adjacent bus bars 120, 420, 720, 820, 920, 1020, 1120) such that the biasing force applied to each leg by the biasing element urges each leg in contact with one of the bus bars. From block 1408, the method 1400 subsequently proceeds to block 1410.

In block 1410 of the illustrative method 1400, the tang (e.g., the tang 1220) of each clip is mounted to a component of the electrical accessory/load (e.g., the electrical load 180) of the power panel.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A clip assembly for use with a bus stack arrangement of a power panel, the clip assembly comprising:
 a metallic clip having a tang and a C-shaped section interconnected with and arranged opposite the tang, wherein the tang is configured for interaction with a component of an electrical accessory of the power panel and the C-shaped section is sized to be positioned between multiple conductive bus bars of the bus stack arrangement when the clip assembly is installed in the power panel; and
 a biasing element coupled to the dip, wherein the biasing element is sized to be positioned between a pair of legs of the C-shaped section of the clip to apply a biasing force to each leg that urges each leg in contact with one of the multiple conductive bus bars to facilitate establishment of an electrical connection between the bus stack arrangement and the electrical accessory when the clip assembly is installed in the power panel, each of the legs of the C-shaped section having a recess within a generally planar engagement surface of each leg, the engagement surfaces of the legs arranged in confronting relation to one another.

2. The clip assembly of claim 1, wherein when the clip assembly is installed in the power panel, the biasing element applies a biasing force to each of the pair of legs of the C-shaped section of the clip that is independent of force applied by an orientation of the C-shaped section relative to the multiple conductive bus bars of the bus stack arrangement and independent of force applied by deformation of the clip assembly.

3. The clip assembly of claim 1, wherein the biasing element includes a coil spring.

4. The clip assembly of claim 1, wherein the tang and the C-shaped section are integrally formed.

5. The clip assembly of claim 1, wherein the clip assembly is installed in the power panel, the biasing element contacts the engagement surfaces of the legs to bias the legs outwardly into engagement with the multiple conductive bus bars of the bus stack arrangement.

6. The clip assembly of claim 1, wherein the clip includes a transition section that interconnects the tang and the C-shaped section.

7. The clip assembly of claim 6, wherein the transition section includes a convex portion and a concave portion interconnected with the convex portion.

8. The clip assembly of claim 7, wherein the tang, the C-shaped section, and the transition section are integrally formed.

9. A power panel comprising:
 a bus stack arrangement including a plurality of conductive bus bars spaced from one another and a plurality of insulators to provide electrical insulation between one or more of the plurality of bus bars;
 one or more electrical accessories coupled to the plurality of bus bars; and
 a plurality of clip assemblies coupled to the plurality of bus bars and the one or more electrical accessories to establish an electrical connection between the plurality of bus bars and the one or more electrical accessories, wherein each clip assembly includes a metallic clip having a tang and a C-shaped section interconnected with the tang and a biasing element coupled to the clip, wherein the tang interacts with a component of the one or more electrical accessories and the C-shaped section is positioned between multiple conductive bus bars of the bus stack arrangement, and wherein the biasing element is positioned between a pair of legs of the C-shaped section to apply a biasing force to each leg that urges each leg in contact with one of the multiple conductive bus bars, each of the legs of the C-shaped section of each clip is formed to include a recess within a generally planar engagement surface of each leg, the engagement surfaces of the legs are arranged in confronting relation to one another.

10. The power panel of claim 9, wherein the clip of each clip assembly is an integrally formed component.

11. The power panel of claim 9, wherein the biasing element of each clip assembly includes a coil spring.

12. The power panel of claim 9, wherein the plurality of bus bars are arranged in three bus bar pairs and the plurality of clip assemblies include three clip assemblies each arranged in contact with one of the three bus bar pairs.

13. The power panel of claim 9, wherein the biasing element of each clip assembly contacts the engagement surfaces of the legs of each clip to bias the legs outwardly into engagement with the multiple conductive bus bars of the bus stack arrangement.

14. The power panel of claim 9, wherein the clip of each clip assembly includes a transition section that interconnects the tang and the C-shaped section.

15. The power panel of claim 14, wherein the transition section of each clip of each clip assembly includes a convex portion and a concave portion interconnected with the convex portion.

16. An apparatus for conductively coupling an electrical load with a line-side bus bar of an electrical distribution system, the apparatus comprising:
an electrically conductive clip comprising:
a load-side clip portion extending in a load-side direction and including a load-side contact surface structured to conductively couple the electrically conductive clip with the electrical load;
a first line-side clip portion extending in a line-side direction, conductively coupled with the load-side clip portion, and including a first bus bar contact surface facing a first outer direction, the first bus bar contact surface including a recess within a generally planar engagement surface;
a second line-side clip portion extending in the line-side direction, conductively coupled with the load-side clip portion, and including a second bus bar contact surface facing a second outer direction different from the first outer direction, the second line-side clip portion being spaced apart from the first line-side clip portion to define a gap extending between a first inner surface of the first line-side clip portion and a second inner surface of the second line-side clip portion, the second bus bar contact surface including a recess within a generally planar engagement surface; and
a compression spring positioned in the gap and extending between the first inner surface of the first line-side clip portion and the second inner surface of the second line-side clip portion.

17. The apparatus of claim 16 wherein the compression spring comprises a spiral spring.

18. The apparatus of claim 16 wherein the compression spring is in a state of compression exerting force on the first inner surface of the first line-side clip portion and the second inner surface of the second line-side clip portion with the electrically conductive clip being disconnected and spaced apart from the line-side bus bar.

19. The apparatus of claim 16 wherein the compression spring extends into a first recess in the first inner surface of the first line-side clip portion and extends into a second recess in the second inner surface of the second line-side clip portion.

20. The apparatus of claim 16 comprising the electrical load conductively coupled with the load-side contact surface.

21. The apparatus of claim 16 wherein the first bus bar contact surface and the second bus bar contact surface are substantially planar.

22. The apparatus of claim 21 wherein the first bus bar contact surface is substantially parallel with the second bus bar contact surface.

23. The apparatus of claim 16 wherein the first line-side clip portion is coupled with the second line-side clip portion by a curved line-side clip portion.

24. The apparatus of claim 23 wherein the first line-side clip portion, the second line-side clip portion and the curved line-side clip portion define a C-shape.

25. The apparatus of claim 24 wherein the first line-side clip portion is substantially parallel to the second line-side clip portion.

26. The apparatus of claim 16 comprising the line-side bus bar conductively coupled with the first bus bar contact surface and the second bus bar contact surface.

27. The apparatus of claim 26 wherein the line-side bus bar includes a first and second bar members including respective first and second receiving surface facing one another, a spacer contacting and maintaining the first and second bar members in spaced apart relationship.

28. The apparatus of claim 27 wherein upon installation of the electrically conductive clip into the line-side bus bar, the compression spring exerts force in a first direction pushing the first bus bar contact surface against the first receiving surface and exerts force in a second direction pushing the second bus bar contact surface against the first receiving surface.

29. The apparatus of claim 28 wherein the electrically conductive clip is slideable into and out of the line-side bus bar.

30. A method of assembling a power panel including (i) a bus stack arrangement that has a plurality of conductive bus bars spaced from one another and a plurality of insulators to provide electrical insulation between one or more of the plurality of bus bars and (ii) a plurality of clip assemblies each having a tang and a C-shaped section interconnected with the tang, each of a pair of legs of the C-shaped section of each clip is formed to include a recess within a generally planar engagement surface of each leg, the engagement surfaces of the legs are arranged in confronting relation to one another, and a biasing element coupled to the clip at the engagement surfaces, the method comprising:
positioning the biasing element of each clip assembly between the pair of legs of the C-shaped section of the clip of each clip assembly to apply a biasing Force to each leg that urges each leg outwardly; and
inserting the C-shaped section of the dip of each dip assembly between multiple bus bars of the bus stack arrangement such that the biasing force applied to each leg by the biasing element urges each leg in contact with one of the multiple bus bars.

31. The method of claim 30, wherein positioning the biasing element of each clip assembly between the pair of legs of the C-shaped section of the clip of each clip assembly includes engaging the biasing element with engagement surfaces of the legs that face one another and at least partially define grooves formed in the legs.

32. The method of claim 31, further comprising mounting the tang of the clip of each clip assembly to a component of an electrical accessory of the power panel.

\* \* \* \* \*